(12) United States Patent
Handzic et al.

(10) Patent No.: US 12,488,154 B2
(45) Date of Patent: Dec. 2, 2025

(54) SYSTEMS AND METHODS FOR DESIGNING KINETIC SHAPES

(71) Applicant: UNIVERSITY OF SOUTH FLORIDA, Tampa, FL (US)

(72) Inventors: Ismet Handzic, Lutz, FL (US); Kyle B. Reed, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 143 days.

(21) Appl. No.: 17/902,322

(22) Filed: Sep. 2, 2022

(65) Prior Publication Data

US 2023/0214541 A1    Jul. 6, 2023

Related U.S. Application Data

(63) Continuation of application No. 15/118,178, filed as application No. PCT/US2015/015683 on Feb. 12, 2015, now abandoned.
(Continued)

(51) Int. Cl.
*G06F 30/00* (2020.01)
*A61H 1/02* (2006.01)
(Continued)

(52) U.S. Cl.
CPC .......... *G06F 30/00* (2020.01); *A61H 1/0222* (2013.01); *A61H 1/0292* (2013.01); *A61H 3/02* (2013.01);
(Continued)

(58) Field of Classification Search
CPC ....... G06F 30/00; G06F 17/11; A61H 1/0222; A61H 1/0292; A61H 3/02; A61H 3/0288; A61H 3/00; A61H 2201/1284; A61H 2201/1418; A61H 2201/1623; A61H 2201/1633; A61H 2201/164; F16K 17/34; A63B 21/012; A63B 21/068; A63B 21/155; A63B 22/16; A63B 22/20
(Continued)

(56) References Cited

U.S. PATENT DOCUMENTS 2,267,409 A    12/1941  Massini
4,184,657 A    1/1980   Jardine
(Continued)

FOREIGN PATENT DOCUMENTS

EP    1868546 B1    3/2009

OTHER PUBLICATIONS

Handzic, Ismet et al., "Motion Controlled Gait Enhancing Mobile Shoe for Rehabilitation", IEEE International Conference on Rehabilitation Robotics, Jun. 29-Jul. 1, 2011, IEEE. (Year: 2011).*
(Continued)

*Primary Examiner* — Cedric Johnson
(74) *Attorney, Agent, or Firm* — HUSCH BLACKWELL LLP

(57) ABSTRACT

In one embodiment, a kinetic shape is designed by determining an applied force to be applied to an object that is to incorporate the kinetic shape, determining a reactive force that is desired to be produced in response to the applied force, inputting the applied force and the reactive force into a kinetic shape equation, and solving the equation to obtain the kinetic shape.

17 Claims, 20 Drawing Sheets

Related U.S. Application Data

(60) Provisional application No. 61/938,759, filed on Feb. 12, 2014.

(51) Int. Cl.
| | |
|---|---|
| A61H 3/02 | (2006.01) |
| F16K 17/34 | (2006.01) |
| G06F 17/11 | (2006.01) |
| A61H 3/00 | (2006.01) |
| A63B 21/00 | (2006.01) |
| A63B 21/012 | (2006.01) |
| A63B 21/068 | (2006.01) |
| A63B 22/16 | (2006.01) |
| A63B 22/20 | (2006.01) |

(52) U.S. Cl.
CPC ........... *A61H 3/0288* (2013.01); *F16K 17/34* (2013.01); *G06F 17/11* (2013.01); *A61H 3/00* (2013.01); *A61H 2201/1284* (2013.01); *A61H 2201/1418* (2013.01); *A61H 2201/1623* (2013.01); *A61H 2201/1633* (2013.01); *A61H 2201/164* (2013.01); *A63B 21/012* (2013.01); *A63B 21/068* (2013.01); *A63B 21/155* (2013.01); *A63B 22/16* (2013.01); *A63B 22/20* (2013.01)

(58) Field of Classification Search
USPC .......................................................... 703/1
See application file for complete search history.

(56) References Cited

U.S. PATENT DOCUMENTS

| | | | |
|---|---|---|---|
| 4,643,377 | A | 2/1987 | Christianson |
| 5,603,614 | A | 2/1997 | Sakata |
| 5,860,629 | A | 1/1999 | Reed |
| 8,317,145 | B2 | 11/2012 | Reed |
| 2003/0201746 | A1 | 10/2003 | Eguchi |
| 2007/0027010 | A1 | 2/2007 | Tsai |
| 2010/0263233 | A1 | 10/2010 | Hansen et al. |
| 2013/0123666 | A1 | 5/2013 | Giuffrida et al. |
| 2013/0152986 | A1 | 6/2013 | Hunter |

OTHER PUBLICATIONS

Handzic, Ismet et al., "Design and Pilot Study of a Gait Enhancing Mobile Shoe", Paladyn Journal of Behavioral Robotics, Jan. 17, 2012, Versita. (Year: 2012).*
Hansen, Andrew H. et al., "Effective Rocker Shapes Used by Able-Bodies Persons for Walking and Fore-Aft Swaying: Implications for Design of Ankle-Foot Prosthesis", Gait & Posture 32, Elsevier B.V. (Year: 2010).*
Ottaviano, Erika et al., "Numerical and Experimental Analysis of Non-Circular Gears and Cam-Follower Systems as Function Generators", Aug. 20, 2007, Mechanism and Machine Theory 43, Elsevier Ltd. (Year: 2007).*
Hansen, Andrew H. et al., "Effective Rocker Shapes used by Able-Bodied Persons for Walking and Fore-aft Swaying: Implications for Design of Ankle-Foot Prostheses", Apr. 15, 2010, Gait & Posture 32, Elsevier B.V. (Year: 2010).
Handzic, Ismet et al., "Motion Controlled Gait Enhancing Mobile Shoe for Rehabilitation", Jun. 29-Jul. 1, 2011, IEEE International Conference on Rehabilitation Robotics, IEEE. (Year: 2011).
De Groot, Allison et al., "Gait Enhancing Mobile Shoe (GEMS) for Rehabilitation", Mar. 18-20, 2009, Third Joint Eurohaptics Conference and Symposium on Haptic Interfaces for Virtual Environment and Teleoperator Systems, IEEE. (Year: 2009).
Handzic, Ismet et al., "Developing a Gait Enhancing Mobile Shoe to Alter Over-Ground Walking Coordination", May 14-18, 2012, IEEE International Conference on Robotics and Automation, IEEE. (Year: 2012).
Handzic, Ismet et al., "Design and Pilot Study of a Gait Enhancing Mobile Shoe", Jan. 17, 2012, Paladyn Journal of Behavioral Robotics, Versita. (Year: 2012).
Handzic, Ismet et al., "The Musical Kinetic Shape: A Variation Tension String Instrument", May 16, 2014, Applied Acoustics 85, Elsevier Ltd. (Year: 2014).
EP Foreign Search Report for PCT/US2015015683 mailed Jan. 8, 2018.
Handzic, et al., "Two-dimensional kinetic shape dynamics: verification and application", Hindawi Publishing Corporation, Journal of Nonlinear Dynamics, 2016.
Handzic, et al., "Kenetic shapes: analysis, verification, and applications", Journal of Mechanical design, vol. 136, No. 6, Apr. 2014.
Handzic, et a., "Analysis and Application of Passive Gait Rehabilitation Methods", PhD thesis, Dept of Mechanical Engineering UF, Jul. 2014.
International Search Report for PCT/US2015/015683 mailed Jul. 23, 2015.
Handzic, "Design and Testing of a Motion Controlled Gait Enhancing Mobile shoe (GEMS) for Rehabilitation." In: University of South Florida, 2011 [online] [retrieved on Jul. 3, 2015] Retrieved from the Internet <URL: http:// ,scholarcommons.usf.edu/etd/3141 />, pp. 1-110.
Handzic, et al., "The Musical Kinetic Shape: A Variable Tension String Instrument", Applied Acoustics; Apr. 19, 2014.
Gilchrist, J., Campbell, J., Donnelly, C., Peeler, J., and Delaney, J., 1973. "Spiral plate method for bacterial : letermination". American Society for Microbiology, 25(2), Feb, pp. 244-252.
Handzic, I., Barno, E., Vasudevan, E. V., and Reed, K. B., 2011. "Design and pilot study of a gait enhancing mobile , shoe". J. of Behavioral Robotics, 2(4), pp. 193-201.
Handzic, I., and Reed, K. B., 2011. "Motion controlled gait enhancing mobile shoe for rehabilitation". In Proc. IEEE Int. :;onf. Rehabilitation Robotics, pp. 583-588.
Sugiyama, Y., and Hirai, S., 2006. "Crawling and jumping by a deformable robot". International Journal of Robotics Research, 25(5-6), Jun, pp. 603-620.
Heng, E., Jia, F., Sha, H., and Wang, S., 2012. "Noncircular belt transmission design of mechanical press". Mechanism and Machine Theory, 57, pp. 126-138.
Ottaviano, E., Mundo, D., Danieli, G. A., and Ceccarelli, M., 2008. "Numerical and experimental analysis of non-circular gears and cam-follower systems as function generators". Mechanism and Machine Theory, 43, pp. 996-1008.
De Groot, A., Decker, R., and Reed, K. B., 2009. "Gait enhancing mobile shoe {GEMS) for rehabilitation". In Proc. Joint Eurohaptics Conf. and Symp. on Haptic Interfaces for Virtual Environment and Teleoperalor Systems, pp. 190-195.
Menant, J.C., Steele, J.R., Menz, H. B., Munro, B. J., and Lord, S. R., 2009. "Effects of walking surfaces and footwear on temporospatial gait parameters in young and older people". Gait and Posture, 29, pp. 392-397.
Hansen, A., Childress, D., and Knox, E., 2000. "Prosthetic foot roll—0ver shapes with implications for alignment of trans ibial prostheses". Prosthetics and Orthotics International, 24(3), pp. 205-215.
Curtze, C., Hof, A. L., van Keeken, H. G., Halbertsma, J.P., Postema, K., and Otten, B., 2009. "Comparative oll-0ver analysis of prosthetic feel". Journal of Biomechanics, 42(11), pp. 1746-1753.
Hansen, A., and Wang, C., 2010. "Effective rocker shapes used by able-bodied persons for walking and ore-aft swaying: Implications for design of ankle-foot prostheses". Gait and Posture, 32, pp. 181-184.
Rielman, J., Postema, K., and Geertzen, J., 2002. "Gait analysis in prosthetics: Opinions, ideas and ::onclusions". Prosthetics and Orthotics International, 61(1), pp. 50-57.

(56) References Cited

OTHER PUBLICATIONS

Rodriguez, G., and Aruin, A., 2002. "The effect of shoe wedges and lifts on symmetry of stance and weight bearing in hemiparelic individuals". Archives physical medicine & rehabilitation, 83(4), pp. 478-482.
Landry, S., Nigg, B., and Tecanle, K., 2010. "Standing in an unstable shoe increases postural sway and muscle activity of selected smaller extrinsic foot muscles." Gait and Posture, 32, Jun., pp. 215-219.
Handzic, I., and Reed, K. B., 2013. "Validation of a passive dynamic walker model for human gait analysis". In Proc. EEE Eng. Med. Biol. Soc. in press.
McGeer, T., 1990. "Passive Dynamic Walking". Int. J. of Robotics Research, 9(2), pp. 62-82.
Adamczyk, P.G., Collins, S. H., and Kuo. A.D., 2006. "The advantages of a rolling foot in human walking" The J. of Experimental Biology, 209, pp. 3953-3963.
Handzic, et al., "Developing a gait enhancing mobile shoe to alter over-ground walking coordination", 2012 IEEE nternational Conference on Robotics and Automation.

\* cited by examiner

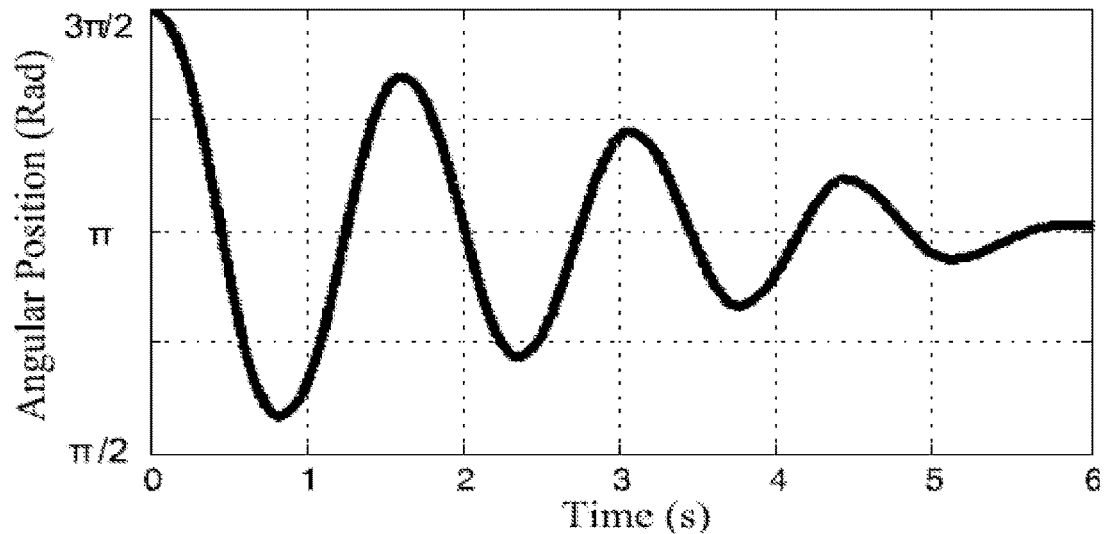
FIG. 7
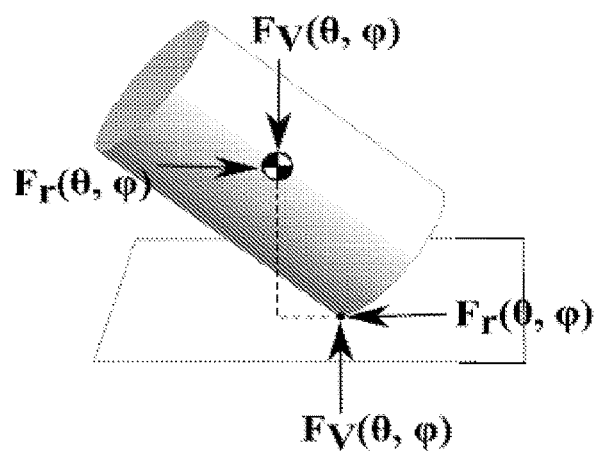 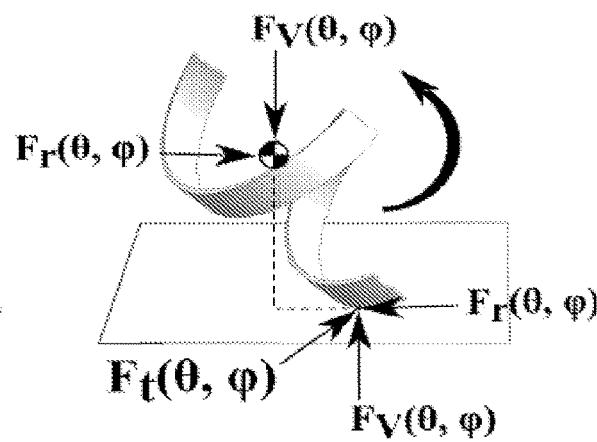
FIG. 8A　　　　FIG. 8B

| Input, F(θ) | | | Output, R(θ) | | Possible Application |
|---|---|---|---|---|---|
| Force Function Definition | Force Function Equation Type | Force Function Plot Example | Kinetic Shape Example (Rec) | Kinetic Shape Example (Polar) | The kinetic shape can be applied to a vast variety of applications. The following are only suggestions |
| Constant | $F(\theta) = A$ | | | | Constant Force Spring Equivalent |
| Steady Increasing *Example 1* | $F(\theta) = A\theta + B$ | | | | Launcher/Dispenser |
| Steady Increasing *Example 2* | $F(\theta) = A\theta + B$ | | | | Mechanical Self-Stabilization |
| Steady Decreasing | $F(\theta) = A\theta + B$ | | | | Rolling/Movement Initiation |
| Exponential | $F(\theta) = A\theta^C + B$ | | | | Crossbow |
| Trigonometric *Example 1* | $F(\theta) = A\sin(\theta) + B\cos(\theta)$ | | | | Hammer Drill |
| Trigonometric *Example 2* | $F(\theta) = A\sin(\theta) + B\cos(\theta) + C$ | | | | Walking Shoe Sole |
| Piecewise | $F(\theta) = \begin{cases} A\theta + B & \text{for } \theta < C \\ -A & \text{for } \theta > C \end{cases}$ | | | | Discrete Force Switch |
| Combination / Miscellaneous | $F(\theta) = ...$ | | | | Linearization of system damping and stiffness |
| Sector Section | Sector sections can be part of any Kinetic shape. | | | | Walking Crutch/Cane Tip |

FIG. 27

| Name | Symbol | Variation / Application | Description |
|---|---|---|---|
| Force Transfer Connector | —— | | |
| Force Input | (IN)$^B$ | (IN)$^2$ | This symbol is used at the beginning of the kinetic shape system diagram or anywhere where new force is added into the system. |
| Force Output | [OUT]$^B$ | [OUT]$^1$ | This symbol represents any force that is an product or output force of the kinetic shape system |
| Kinetic Shape Force Left | ☉$^B$ | ☉$^1$ | This represents a kinetic shape that creates a radial ground reaction force in the left direction. "Left" is a arbritary designation dependent on the sign convention. |
| Kinetic Shape Force Right | ☉$^n$ | ☉$^4$ | This represents a kientic shape that creates a radial ground reaction force in the right direction. "Right" is a arbritary designation dependent on the sign convention. |
| Force Devision | | | This symbol represents applying a force to one or more kinetic shapes in series. This devides the force each time by a value greater than one. |
| Force Multiplication | | | This symbol represents pulling a kinetic shape by the rolling platform, while it reacts by pushing perpendicular and by the shape axle. This multiplies the force. |
| Force Addition | | | This symbol represents two kinetic shape forces adding in reaction forces. |
| Force Subtraction | | | This symbol represents two kinetic shape forces subtracting in reaction forces. |
| Spring Force | | | This symbol represents a spring-like mechanism attached between a kinetic shape and ground or other configuartions. Note that a spring is kinetic shape position dependent. |
| Redirection | | | This symbol represents a redirection or reorientation of force, by a gear, pulley, or sprocket. |
| Inline Torque Input | $\tau/r$ | 10/0.1 | This is an input torque, $\tau$, inline with a force connection, which may represent a rotary actuator such as a motor. This torque has to be devided by the torque lever, $r$. |
| Torque Output | $r$ | 0.3 | This is an torque, $\tau$, output from the kinetic shape system. This symbol must be defined with a torque lever, $r$. |
| Force Transfer Loss | N% | 30% | This symbol is used as an indicator of force transfer loss within the kinetic shape system. This may be due to striction, friction, or misalignments. |
| Conditional Statement | | | This symbol is used when a kinetic shape's ground reaction force definition can be positive or negative. When connected to two other kinetic shapes, it will engage one shape when it is positive and the other when it is negative. This symbol may also output or disipate force as an option. |

FIG. 28

SYSTEMS AND METHODS FOR DESIGNING KINETIC SHAPES

CROSS-REFERENCE TO RELATED APPLICATION

This application claims priority to U.S. Provisional Application Ser. No. 61/938,759, filed Feb. 12, 2014, which is hereby incorporated by reference herein in its entirety.

NOTICE OF GOVERNMENT-SPONSORED RESEARCH

This invention was made with Government support under grant R21HD066200, awarded by the National Institutes of Health. The Government has certain rights in the invention.

BACKGROUND

Kinetic shapes are shapes that can be used to provide a desired reactive force in response to an applied force. If a kinetic shape is incorporated into a shoe, for example, as the outer edges of the wheels mounted to the shoe, the force of the wearer's weight applied during a step can generate a reactive force that can either propel the foot forward or rearward, depending on the nature and orientation of the kinetic shape. It would be desirable to have a way to determine the optimal kinetic shape to use in a given application relative to a force that will be applied and a desired reactive force.

BRIEF DESCRIPTION OF THE DRAWINGS

The present disclosure may be better understood with reference to the following figures. Matching reference numerals designate corresponding parts throughout the figures, which are not necessarily drawn to scale.

FIG. 7 is a graph that illustrates that, when disturbed or placed at an unstable position, a two-dimensional kinetic shape can settle at its equilibrium point if its force function is zero at that point.

FIG. 8A is a diagram that illustrates that a cylinder only produces an RGRF force to keep it from slipping.

FIG. 8B is a diagram that illustrates that a helix curve produces an additional tangential ground reaction force (TGRF) for sideways rolling.

FIGS. 27 and 28 are tables that identifies example kinetic shapes and applications for those shapes.

DETAILED DESCRIPTION

As described above, it would be desirable to have a way to determine the exact kinetic shape to use in a given application relative to a force that will be applied and a desired reactive force. In some embodiments, equations independently derived for two- and three-dimensional kinetic surfaces can be used to design such a kinetic shape. In some embodiments, the shapes can be derived by solving the equations after inputting variables or mathematical functions for an applied force and a desired reactive force. Once the shapes have been derived, objects incorporating the shapes can be constructed.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
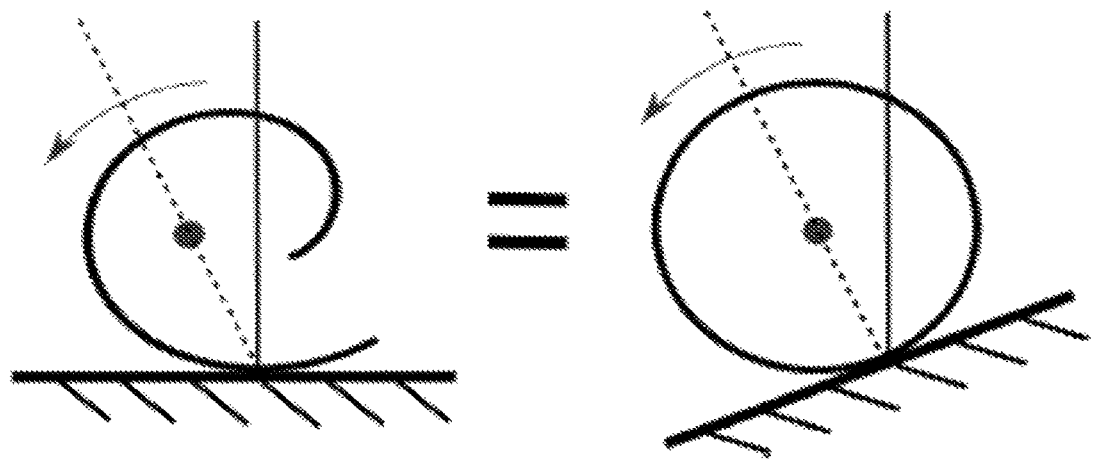
FIG. 1 is a diagram that illustrates the instantaneous equivalence, in terms of rolling dynamics, of a circular wheel rolling down a decline and a shape with a negatively changing radius.

The following nomenclature is used in the disclosure that follows in relation to two-dimensional and three-dimensional kinetic shapes:

Two-Dimensional Kinetic Shapes
  $\theta$ Angle around kinetic shape rotation axle
  $R(\theta)$ Kinetic shape radius
  $\psi(\theta)$ Angle relating shape tangent to vector and applied weight to radial force
  $F_v(\theta)$ Weight applied at axle perpendicular to ground
  $F_r(\theta)$ Radial ground reaction force parallel to ground
  $L(\theta)$ Horizontal distance between applied weight vector to ground contact point
  $H(\theta)$ Vertical distance between shape axle and ground Three-Dimensional Kinetic Shapes:
  $\theta, \varphi$ Elevation and azimuth angle around shape axle
  $R_r(\theta,\phi)$ Shape radius in the radial plane
  $R_t(\theta,\phi)$ Shape radius in the tangential plane
  $F_v(\theta,\phi)$ Weight applied orthogonal to ground
  $F_r(\theta,\phi)$ Radial ground reaction force (RGRF) of shape parallel to ground
  $F_t(\theta,\phi)$ Tangential ground reaction force (TGRF) of shape parallel to ground It can be demonstrated that a perfectly circular shape only rolls on a flat surface when placed on a decline. By straightforward dynamic analysis of a circular shape, it is clear that, when placed on a decline, the sum of moments does not equal zero, hence the shape will roll. It can also be demonstrated that a smooth two-dimensional polar shape with a non-constant radius will roll on a flat surface around the instantaneous point of contact. It will roll toward the decreasing radius with respect to angle when a vertical force is applied to its axle. Both of these situations create the same instantaneous dynamic rolling effect, which is illustrated in FIG. 1.

The rolling of an irregularly curved shape, such as a spiral rolling on a flat surface, is useful and has not received much research attention. Described in the disclosure that follows is the derivation of two- and three-dimensional shapes that, when placed on a flat plane and loaded with a known weight at the axle point, produce a desired ground reaction force parallel to the flat plane. This derived shape with known force parameters can in turn be used in a variety of static and dynamic applications.

In the second century BC, astronomer and mathematician Conon of Samos was the first to study conic sections, which are curves created by the intersections of cones. His work greatly inspired a colleague, Archimedes, to study a special two-dimensional curve now known as the Archimedean spiral. The Archimedean spiral is given by Equation (1), $$R(\theta)=a+b\theta; \quad \text{(Equation 1)}$$

where a and b are arbitrary spiral constants. While there are many variations of such a curve (e.g., logarithmic spiral, Cortes spiral, etc.), the Archimedean spiral is defined in polar coordinates as a curve that increases at a steady rate in radius as the angle increases. This shape is particularly interesting in its physical form because it rolls by itself on a flat surface and closely mimics a circular wheel rolling down a hill. While the physical form of the Archimedean spiral is applicable in many disciplines, such as fluid compression or microbiology, it is found to be particularly attractive to mechanical designs where passive rolling or force redirection is desired.

An example of such a design is the gait enhancing mobile shoe (GEMS) that was developed for gait rehabilitation of individuals with neurological disorders, such as stroke. The GEMS mimics a split-belt treadmill (a treadmill with two independently controlled treads) by pushing the individual's foot backward as he or she steps onto the shoe with Archimedean spiral-shaped wheels. As the user applies his or her weight onto the spiral wheels, the wheels react by rolling horizontally. This method is completely passive in that it does not utilize any energized motors or actuators, but only uses the person's weight to create motion. Unlike a split-belt treadmill, the GEMS is portable and can apply rehabilitative motions for a longer amount of time. This two-dimensional rolling motion is essentially created by the changing of the radius in a rounded shape.

A static version of a spiral shape is used in rock climbing equipment. The safety equipment known as a spring-loaded camming device (SLCD) is commonly used by rock climbers to secure their ropes into rock cracks while climbing. The SLCD utilizes two freely spinning spiral-shaped cams facing opposite directions. When the climber falls and applies a sudden force between the spiral cams and the rock surface, the cams are pushed outwards increasing friction between the cams and rock surface and providing enough force to resist the falling climber. This static force redirection is similar, but opposite, to the previously described GEMS because it directs horizontally applied force into a perpendicular force. While this climbing innovation has been on the market for decades, no significant analysis/research has been published regarding the variation of forces along the cam perimeter and optimization of its spiral shape separate from using the logarithmic spiral shape.

Spiral-shaped wheels have a resemblance to objects with an eccentric rotation point, such as cams. Research on cam design focuses on the transfer of kinematics of two or more entities, generally rotary motion (the cam) into linear motion (the follower). While research on camming generally focuses on kinematics and tribology, it does not have free or forced rolling dynamics or force redirection of continuous irregular shapes.

The study of belt drives and gearing generally focuses on torque, rotational velocities, and normal forces between gear tooth surfaces. This includes the kinematics of circular and non-circular (elliptical) belt pulleys and gears, and the kinematics of rack and pinion type of mechanisms. Again, little research has been performed for free rolling and force redirection of irregular shapes. One related study derived a square wheel with matching roads (a type of rack and pinion) that showed some insight into irregular shape rolling kinematics, but kinetics and static equilibrium of these shapes are not addressed.

Another study considered the geometry of a two-dimensional circular, noncircular, and logarithmic shape rolling.

However, it did not consider any kinetics and strictly focused on the traces of curves (roulettes) created when rolling over various surfaces.

Spiral patterns are also possible in three-dimensions, such as a rhumb line (loxodrome). Helix-type spirals can be included in the definition of three-dimensional spirals, which have no change in radius, only in the depth dimension. No literature could be found that defines the kinetic or kinematic behavior of such shapes (or curves) during free or forced rolling dynamics. However, such research is needed for gait correction and rehabilitation.

Roll over shapes (ROSs) are foot rocker shapes that the foot rolls over when completing the stance phase during the gait cycle. ROSs produce enormous effects in gait kinematics, kinetics, and balance and ROSs are important in prosthetic design. However, current gait studies have not been able to analytically predict the behavior of ROSs. A significant issue in lower limb prosthetic designs are the forces exerted by the prosthetic onto the user's stump. These forces can be manipulated or even diminished if the ROS is modified properly. Besides prosthetic design, orthotic therapy and gait rehabilitation using specially designed shoe soles can benefit patients of diseases such as cerebral palsy, Parkinson's, and stroke, and increased muscle activity of selected foot muscles.

ROSs also play a critical role in the design of passive dynamic walkers (PDWs), which can be used to predict normal and pathological human gait. A PDW (two-dimensional or three-dimensional) mimics human gait by walking down an incline solely due to gravity, hence they are completely passive. Design trials have indicated that a most effective foot rocker radius to be ⅓ of total leg length, exactly matching the most efficient human ROS radius. Although ROSs are a key component to the dynamics and stability of PDWs, there does not appear to be any literature that specifically specifies the size or shape of ROS for PDWs.

Figure 2A:
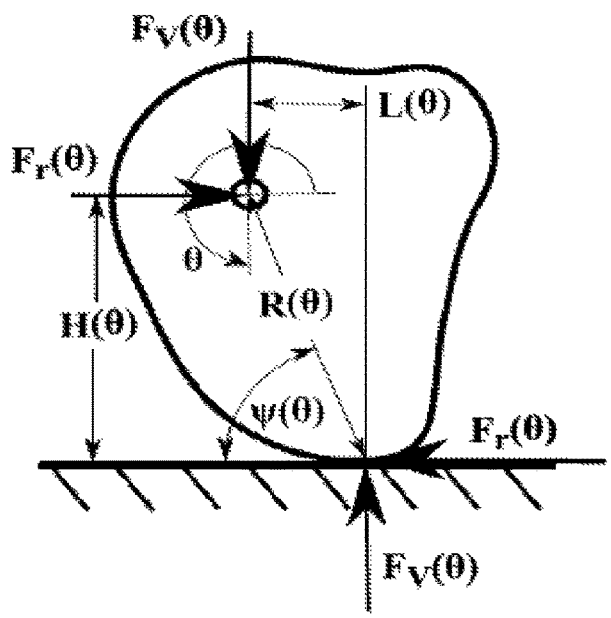
FIG. 2A is a diagram illustrating static equilibrium of a kinetic shape.

A curved and continuous, arbitrarily two-dimensional shape that is pressed onto a flat plane at its axle point tends to rotate towards the decreasing radius. This rotation occurs because the applied weight is not vertically aligned with the point of ground contact, which creates unmatched moment couples with the radial ground reaction force (RGRF). Hence, the shape is not in static equilibrium and rolls. However, if the rolling motion of this shape is restrained by a horizontal force at the axle point so that the shape is in static equilibrium, the sum of all forces and moments must equal zero, as illustrated in FIG. 2A. For this to happen, the moment couple created by the RGRF (friction) and the equal and opposite restraining force must be equal to the moment couple created by the applied weight and the equal and opposite vertical ground reaction force. Because the shape varies in radius, the RGRF component pushing away from the axis, $F_r(\theta)$, must vary as well. It is assumed that the friction force between the ground and the shape is large enough for the shape not to slip. It is also assumed that there is no deformation of the shape or ground. This analysis is also valid when the applied force at the shape axle is much greater than the combined gravitational forces applied at the center of mass of the shape or if the center of mass coincides with the shape axle.

Figure 2B:
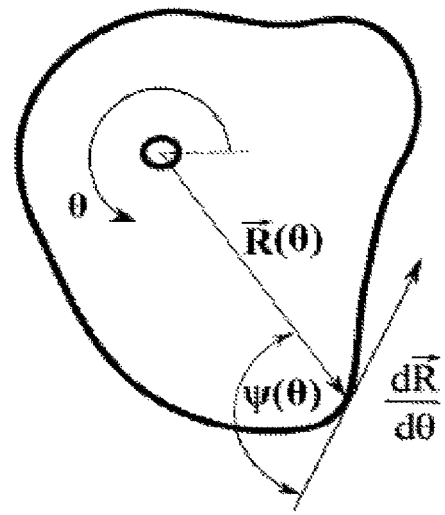
FIG. 2B is a diagram illustrating kinetic shape geometric parameters.

A general formulation can be derived to create a kinetic shape that will generate a desired RGRF given a known, applied weight. The derivation can begin by adding the two moment couples acting on a general two-dimensional shape under static equilibrium $$\Sigma M_z = F_v(\theta)L(\theta) - F_r(\theta)H(\theta) = 0 \quad \text{(Equation 2)}$$

where $L(\theta)$ and $H(\theta)$ are shown in FIG. 2A and defined as $$H(\theta) = R(\theta)\sin(\psi(\theta)) \quad \text{(Equation 3)}$$

$$L(\theta) = R(\theta)\cos(\psi(\theta)) \quad \text{(Equation 4)}$$

and $\psi(\theta)$ is defined in FIG. 2B. Substitution of Equations (3) and (4) into the statics equilibrium Equation (2) yields $$F_v(\theta)[R(\theta)\cos(\varphi(\theta))] = F_r(\theta)[R(\theta)\sin(\psi(\theta))] \quad \text{(Equation 5)}$$

Dividing out $R(\theta)$ and applying appropriate trigonometric identities results in $$\psi(\theta) = \tan^{-1}\left(\frac{F_v(\theta)}{F_r(\theta)}\right) \quad \text{(Equation 6)}$$

Equation (6) defines the angle $\psi(\theta)$ along the perimeter of the shape. $\psi(\theta)$ relates the weight applied at the shape axle and the RGRF at ground contact.

$\psi(\theta)$ can also be defined as the angle at the point of ground contact between the ground vector (shape tangent), $dR = d\theta$, and the radial vector (axle to ground contact point), $R(\theta)$, as shown in FIG. 2B. This relation is defined as $$\psi(\theta) = \tan^{-1}\left(\frac{R(\theta)}{dR/d\theta}\right) \quad \text{(Equation 7)}$$

It is apparent that Equations (6) and (7) can be equated and reordered to form a first order ordinary differential equation:

$$\frac{dR}{d\theta} = \frac{R(\theta)F_r(\theta)}{F_v(\theta)} \quad \text{(Equation 8)}$$

Equation (8) can be solved using the method of separation of variables by first rearranging, $$\left(\frac{1}{R(\theta)}\right)dR = \left(\frac{F_r(\theta)}{F_v(\theta)}\right)d\theta \quad \text{(Equation 9)}$$

and then integrating both sides of the equation to solve for the shape radius.

$$R(\theta) = \exp\left[\int \frac{F_r(\theta)}{F_v(\theta)} d\theta + \text{Constant}\right] \quad \text{(Equation 10)}$$

where the integration Constant is dependent on the initial radius of the shape. When solved for the Constant in Equation (10), the resulting equation is $$R(\theta) = R(\theta_i)\exp\left[\int \frac{F_r(\theta)}{F_v(\theta)} d\theta\right] \quad \text{(Equation 11)}$$

where $\theta_i$ is the initial angle of the kinetic shape. Equation (11) is a two-dimensional kinetic shaped equation that can be used to derive a two-dimensional kinetic shape that produces an RGRF, $F_r(\theta)$, when a load perpendicular to the ground at axle point, $F_v(\theta)$, is applied. Subsequent paragraphs below show how Equation (11) can be used to design a shape and experimentally validate force profiles.

A derived kinetic shape can be checked to determine if it produces the desired reaction forces when loaded by taking the obtained shape R(θ) and finding ψ(θ) in Equation (7), and then inputting it back into Equation (6). The resulting forces should match the initial input forces. This also enables one to find the kinetic profile of any irregular curved two-dimensional shape.

The two-dimensional kinetic shape equation, Equation (11), yields a unitless radius value. This indicates that it only depends on the force ratio rather than the size of the shape. Thus, when loaded with a fixed weight, the same kinetic shape with different scaling factors will produce the same RGRF. For example, a kinetic shape for a constant 800 N weight and constant 200 N RGRF input will be the exact same as a kinetic shape for a constant 4 mN vertical and constant 1 mN RGRF input regardless of its scaled dimensions.

In practice, it may be desirable to reverse the kinetic shape definition in Equation (11). That is, it may be advantageous to know what RGRF response a given shape may provide when a weight is applied. Thus, if a two-dimensional shape, R(θ), is already given, known, provided, or approximated, Equation (11) can be rearranged to predict the shape's ground reaction response, $F_r(\theta)$, when a known applied vertical force, $F_v(\theta)$, is applied to the shape's rotation axle. This auxiliary equation is Equation (12):

$$F_r(\theta) = \frac{F_v(\theta) \frac{dR(\theta)}{d\theta}}{R(\theta)} \quad \text{(Equation 12)}$$

Equation (12) can be rearranged so that when the shape function and RGRF is given, one can the applied weight, $F_v(\theta)$, that is being applied to generate the RGRF, $F_r(\theta)$, at a specific angle around the kinetic shape.

If a derived and known two-dimensional kinetic shape is in motion (i.e., it is not restrained) its motion can be described as Equation (13) or Equation (14):

$$\ddot{\theta} = \frac{d^2\theta}{dt^2} = \frac{F_v(\theta)R(\theta)\cos[\psi(\theta)]}{J_G(\theta)} \quad \text{(Equation 13)}$$

$$\ddot{\theta} = \frac{d^2\theta}{dt^2} = \frac{F_r(\theta)R(\theta)\sin[\psi(\theta)]}{J_G(0)} \quad \text{(Equation 14)}$$

Here, $d^2\theta/dt^2$ is the angular acceleration of the kinetic shape and $J_G(\theta)$ is the rotational moment of inertia about the rotation axis.

Figure 3:
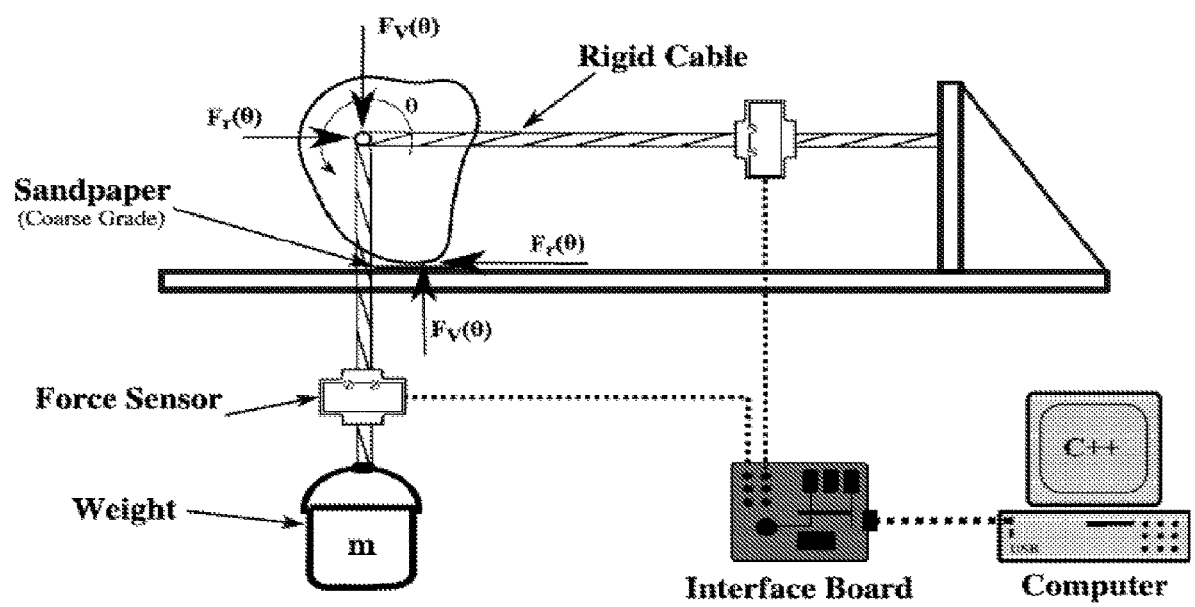
FIG. 3 is a diagram of a test structure used to test two-dimensional kinetic shapes.

The two-dimensional kinetic shape equation (Equation (11)) was verified with the simple setup shown in FIG. 3. A weight was applied to a shape axle and the reaction forces exerted by the shape axle were measured with a force sensor (Omega LC703) placed in line with the forces. To prevent the kinetic shape from slipping, two-sided course grade sandpaper was placed at ground contact. As the applied weight was gradually loaded, the RGRF increased.

The tested kinetic shapes were loaded at π/6 rads intervals from zero to 2π rads. Some perimeter points, such as the lowest radii on a spiral shape, were omitted because the ground contact could not reach that particular perimeter point (i.e., FIG. 4A at 0 rads), however this usually was only one point.

The reaction load for each perimeter point was recorded with a mass of 7:9 kg to 18:0 kg at four even intervals applied to the shape axle. The mean and standard deviation for each point was calculated in terms of percent force transfer (100*$F_r(\theta)$/$F_v(\theta)$), which was then multiplied by 800 N.

Three two-dimensional kinetic shape examples were chosen for verification and were laser cut from tough 0:25 in (0:64 cm) thick acetal resin (Delrin®) plastic. The laser cutter used to cut test shapes was a 60 Watt Universal Laser System VLS4.60.

To demonstrate example kinetic shape designs using Equation (11), three different desired force functions with constant applied weight were chosen: constant, sinusoidal with an offset, and Fourier series expanded non-smooth RGRF function. Each derived kinetic shape assumed a constant vertical force of 800 N. The magnitude of these force functions were chosen for the convenience of experimentation. Although the analysis can be expanded to kinetic shapes that revolve more than once, the focus of the experimentation was placed on shapes that range from zero to it rads. It is important to note that if the two-dimensional shape is to be continuous around one revolution, Equation (15) must be satisfied.

$$\int_{\theta_i}^{\theta_f} \frac{F_r(\theta)}{F_v(\theta)} d\theta = 0 \quad \text{(Equation 15)}$$

Initially, a shape defined by a constant force function and a constant applied weight function was considered. Equations (16) and (17) describe the input functions used to derive the first two-dimensional kinetic shape. The kinetic shape was started with an initial shape radius of 2:5 in (6:35 cm) and ends with a 5:46 in (13:86 cm) radius.

$$F_v(\theta)=800\text{N} \quad \text{(Equation 16)}$$

$$F_r(\theta)=100\text{N} \quad \text{(Equation 17)}$$

With these forces and initial radius, Equation (11) becomes $$R(\theta) = \exp\left[\frac{100}{800}\theta + \ln(2.5)\right]_{\theta=0}^{\theta=2\pi} \quad \text{(Equation 18)}$$

Figure 4:
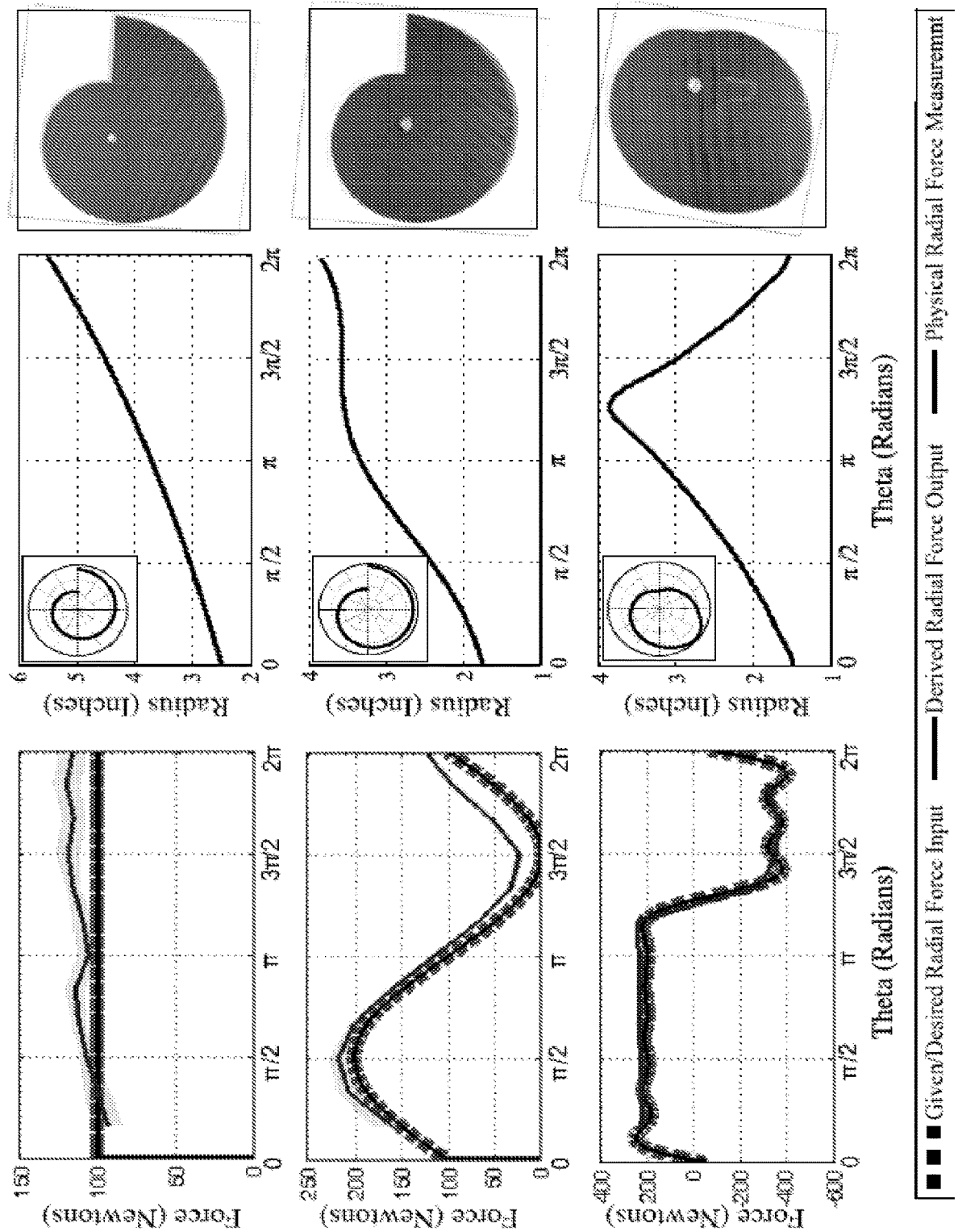
FIG. 4A is a verified force profile for a two-dimensional Shape 1 that forms a spiral with a steadily increasing radius as it is defined by a constant vertical force input and a constant radial ground reaction force (RGRF) output all around the shape.
FIG. 4B is a verified force profile for a two-dimensional Shape 2 that forms a monotonically increasing radius spiral that, when a constant weight is applied, reacts with a sinusoidal RGRF around its perimeter.
FIG. 4C is a verified force profile for a two-dimensional Shape 3 that forms a continuous shape that, when a constant weight input is applied, initially reacts with a positive reaction force and then switches directions to form a negative RGRF.

As an 800 N force is applied at the axle of the kinetic shape, the shape will react with a 100 N force regardless of the rotation angle. As seen in FIG. 4A, the gradual and slight exponential increase in shape radius, dR/dθ, statically produces a constant force at any perimeter point around the shape, creating a spiral kinetic shape. Note that the units, and thus the scaled size, are irrelevant and this kinetic shape would behave the same if scaled up or down.

As shown in FIG. 4A, the physical measurements are in good agreement with theoretical values. There are some variations; however, which can be accounted for by shape surface and test setup imperfections. Although the force profile standard deviation is not always within predicted theoretical range, the trend is relatively constant.

A kinetic shape can also be derived using a more complicated sinusoidal force function with a constant offset. Equations (19) and (20) describe the input functions that define this two-dimensional kinetic shape.

$$F_v(\theta)=800\text{N} \quad \text{(Equation 19)}$$

$$F_r(\theta)=100 \sin(\theta)+100\text{N} \quad \text{(Equation 20)}$$

With these forces, Equation (11) then becomes $$F_r(\theta) = \left[\frac{1}{8}(\theta - \cos(\theta)) + \ln(1.75)\right]_{\theta=0}^{\theta=2\pi} \quad \text{(Equation 21)}$$

Unlike in the previous example that produces a constant RGRF, this shape creates a varying sinusoidal force throughout the rotation. In this example design it is clear that the reaction force is dependent on dR/dθ of the shape. As the sinusoidal force reaches a maximum at π/2, dR/dθ is steepest and produces the highest RGRF. Likewise, as the input force reaches a minimum of zero at 3π/2, dR/dθ is zero as well. At 3π=2, the kinetic shape instantaneously behaves as a circular wheel would, and, like a circular wheel, it does not produce a RGRF when vertically loaded at its axle.

The kinetic shape assumes a spiral shape with a starting radius of 1:75 in (4:44 cm) and a final radius of 3:82 in (9:70 cm). The shape again resembles a spiral due to the fact that the sum of force around the shape perimeter is non-zero. The physically measured force profile for this two-dimensional kinetic shape, shown in FIG. 4B, was slightly higher than predicted, however the sinusoidal trend was in good agreement.

A kinetic shape can be designed with any input force function. The analysis can be expanded to a piecewise force function that has been expanded using ten Fourier series terms to demonstrate that nearly any force profile can be created. A piecewise force function was defined as $$F_v(\theta) = 800N \quad \text{(Equation 22)}$$

$$F_r(\theta) = \begin{cases} 200N, & 0 \le \theta \le 3.8 \\ 4380 - 1100\theta N, & 3.8 < \theta < 4.3 \\ -350N, & 4.3 \le \theta < 2\pi \end{cases} \quad \text{(Equation 23)}$$

Note that this time the RGRF function crosses zero at 4:1 rads. At exactly this point, the shape produces no force and the radius starts to decrease in order to produce a negative force. This shape does not form a spiral, but is continuous around its perimeter, starting and ending at the same radius (see FIG. 4C). Measurements on the physical shape verified the predicted values. Physical data falls well within theoretical values. Note that the standard deviation of measurements increases where the force profile fluctuates the most.

A restrained two-dimensional kinetic shape is able to statically produce desired reaction forces. However, an unrestrained kinetic shape can be used to exert a known force around its perimeter over time in a dynamic setting. In other words, a kinetic shape can be designed to exert a predicted dynamic force onto an object or itself creating a predicted dynamic response.

Figure 5:
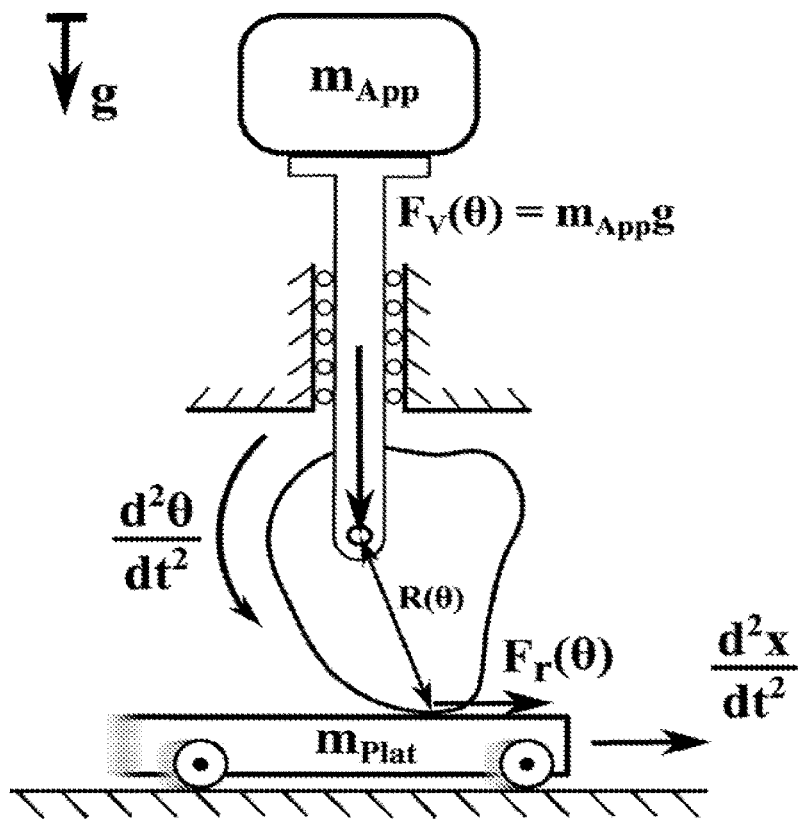
FIG. 5 is a diagram that illustrates a flat plate with a known mass being displaced with a predicted linear pushing force that causes a linear acceleration in response to a force applied by a kinetic shape.

One application of a kinetic shape in a dynamic setting is to displace a flat plate on the ground. It is assumes that a no-slip condition exists between the kinetic shape and the flat plate and that there is no friction between the flat plate and ground. Also, the shape axle is constrained to only move along the vertical direction as shown in FIG. 5.

As a vertical force is applied to the kinetic shape, the RGRF pushes the flat plate in the horizontal direction, thus changing its velocity. A sinusoidal kinetic shape that weighs 0.01 kg (0.1 N) (FIG. 4B) being pushed vertically at its axle with 8:0 N force onto a flat plate weighing 0.5 kg (4.9 N) was simulated to illustrate this concept. The shape mass with respect to the dispensed plate is considered negligible. All dynamic behavior was analyzed with SolidWorks Motion Analysis.

Figure 6:
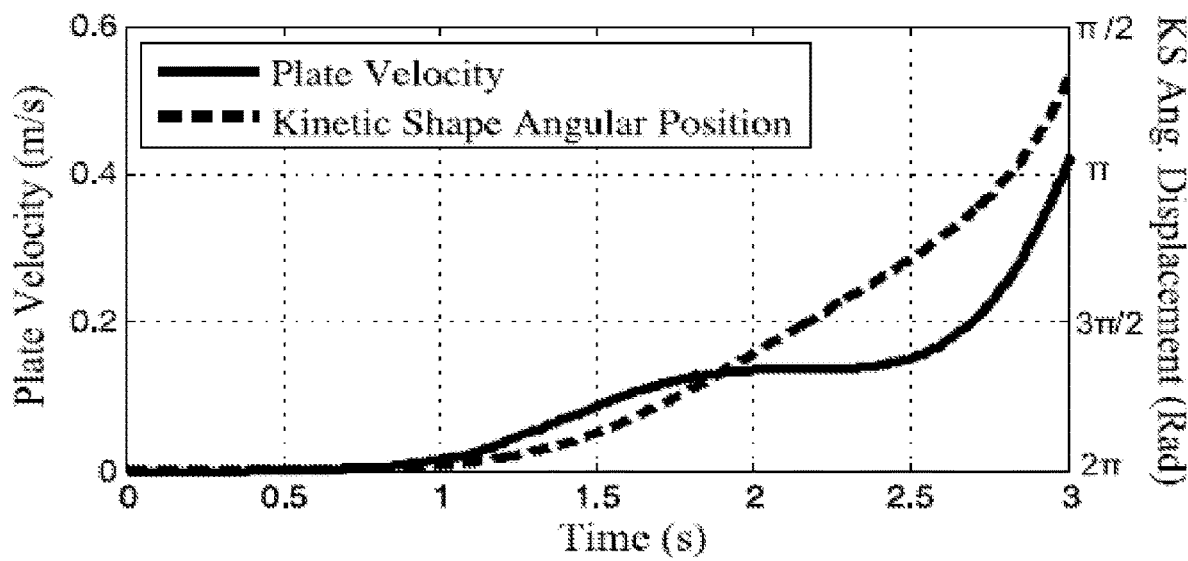
FIG. 6 is a graph that plots the dynamic interaction of two-dimensional Shape 2 (FIG. 4B) and a 0.5 kg flat plate.

FIG. 6 shows the plate velocity and shape rotation position versus time. The magnitude of the applied vertical force only affects the simulation time. Because the shape was not continuous all around, setup dynamics were recorded from 2π to 1:7 rads, rolling from the greatest radius at 2π to the lowest radius.

Referring back to FIG. 4B, this velocity profile shows the effect of changing the sinusoidal output force around the shape. Adhering to the basic principle dynamic of Newton's second law, as the RGRF decreases to zero, so does the acceleration of the moving plate, creating a plateau in plate velocity at 3π/2. Thereafter, the pushing force increases dramatically and so does the plate velocity.

Although this simulation setup and results are insightful of pushed plate dynamics, it can be relatively viewed as regular over-ground rolling of the kinetic shape, where the shape moves over a stationary surface. However, in over-ground shape rolling, the changing moment of inertia about ground contact factors into the rolling dynamics, which can obfuscate this example. If the weight applied at shape axle is much larger than the weight of the shape itself, shape inertial forces can be neglected.

Dynamic self-stabilization is an interesting mechanical aspect of an unrestrained kinetic shape. A system that is able to self-stabilize will correct its state to a stable value when perturbed by an external force or when started at any other state. When an unrestrained and rolling kinetic shape RGRF profile switches signs, crossing the zero axis, it creates a stable point. Once loaded, the shape will roll around its perimeter, eventually settling onto this zero stable point due to non-conservative damping forces such as friction.

This behavior is illustrated in FIG. 7, in which the kinetic shape RGRF is described by a simple sinusoid switching force sign at 0 and π rads. In a virtual simulation with SolidWorks Motion Analysis, this shape is pushed down with a constant weight (50 N) that is significantly larger than the shape weight (0.1 kg; 1 N) starting at 3π=2 rads after which it oscillates and comes to a halt at m rads. While the behavior is consistent, the settling time is dependent on the applied weight, shape mass (and/or plate mass), and non-conservative forces. It is stressed that shape inertia becomes negligible if the applied weight is much larger than the shape weight. This concept can be utilized in any mechanical structure in which the stable position of the structure is important after disruptive forces are applied.

The above analysis can be expanded into three dimensions by deriving and analyzing a three-dimensional kinetic shape. The behavior of a three-dimensional kinetic shape can be difficult to visualize. While a two-dimensional kinetic shape produces only one RGRF that pushes radially away from the shape's axle, a three-dimensional kinetic shape can theoretically produce two force components: the same RGRF pushing away from the axle point and a tangential ground reaction force (TGRF) pushing around the vector of weight application that is orthogonal to the ground plane.

To visualize the TGRF, one can imagine a cylinder sitting on a flat plane (e.g., a cup on a table) as shown in FIG. 8A. If the cylinder is tipped over, the ground experiences only an RGRF to keep it from slipping. However, if the cylinder's sides are not uniform in length around its perimeter, such as in a helix curve as shown in FIG. 8B, the tipped helix will tend to push and roll around the vertical axis which runs through the center of mass and is perpendicular to ground. This rolling motion is caused by the TGRF acting on the cylinder's rim. This TGRF can also be generated if a two-dimensional kinetic shape is wrapped around a vertical axis with a non-constant radius.

A set of equations can be derived that enables the construction of shapes that produce a known RGRF and TGRF when vertically loaded. Similar methods and assumptions utilized to derive a two-dimensional kinetic shape are used to produce an analytical model of a three-dimensional kinetic shape.

Figure 9:
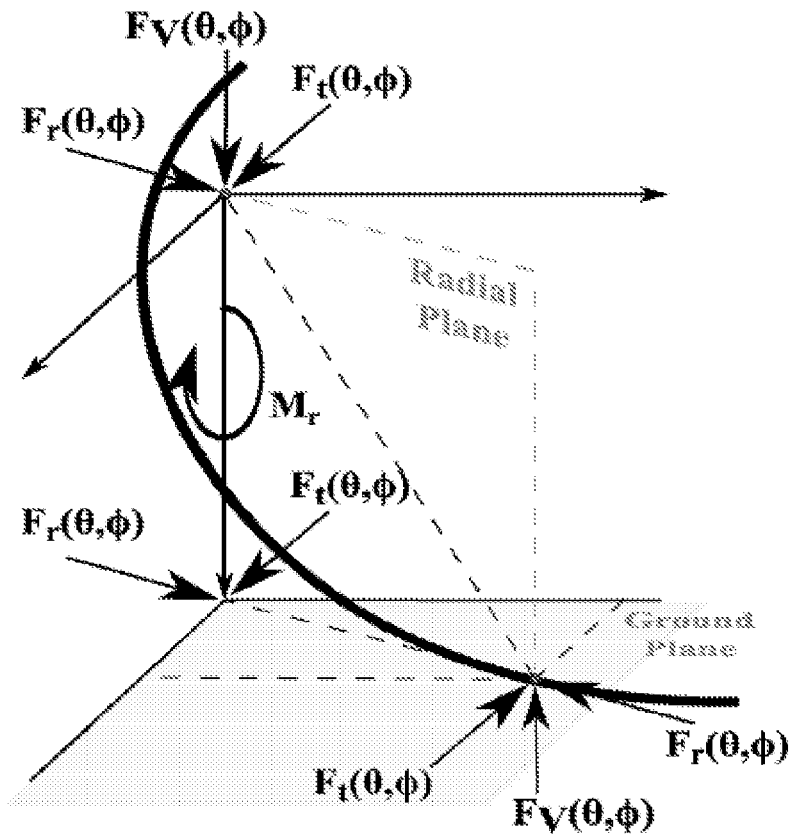
FIG. 9 is a free body force diagram of a three-dimensional kinetic shape.

Consider a three-dimensional shape/curve in static equilibrium, as shown in FIG. 9. The summation of all moment couples in the radial plane and about the vertical vector yields the following equations:

$$\sum M_r = \quad \text{(Equation 24)}$$
$$F_v(\theta, \phi)R(\theta, \phi)\cos(\psi) \ldots - F_r(\theta, \phi)R(\theta, \phi)\sin(\psi) = 0$$

$$\sum M_v[F_t(\theta, \phi)\cos(\phi)](R(\theta, \phi)\cos(\psi)\cos(\phi)) \ldots - [ \quad \text{(Equation 25)}$$
$$F_r(\theta, \phi)\cos(\phi)](R(\theta, \phi)\cos(\psi)\sin(\phi)) = 0$$

Figure 10:
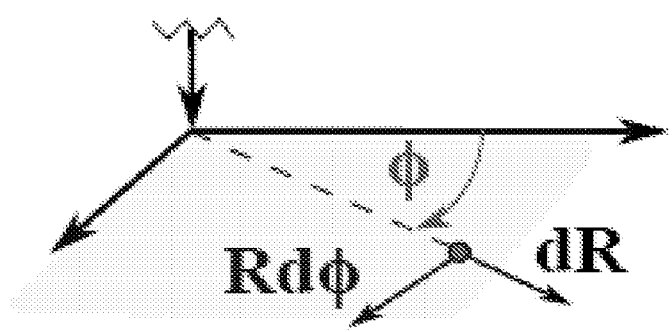
FIG. 10 is a diagram that illustrates geometric parameters at three-dimensional shape ground contact.

These kinetic equilibrium equations are simplified, rearranged, and related to the geometric parameters shown in FIG. 10 following a similar derivation described above.

$$\tan(\psi) = \frac{F_r(\theta, \phi)}{F_v(\theta, \phi)} = \frac{R(\theta, \phi)}{dR/d\theta} \quad \text{(Equation 26)}$$

$$\tan(\theta) = \frac{F_t(\theta, \phi)}{F_r(\theta, \phi)} = \frac{dR/d\phi}{R(\theta, \phi)} \quad \text{(Equation 27)}$$

Angle $\psi$ again relates forces in the radial plane while also relating the radial vector to the ground plane. Angle $\phi$ relates the TGRF to the RGRF while also relating the geometric parameters shown in FIG. 10.

After rearranging terms, two first order ordinary differential equations remain:

$$\left(\frac{1}{R(\theta, \phi)}\right)dR = \left(\frac{F_r(\theta, \phi)}{F_v\theta, \phi}\right)d\theta \quad \text{(Equation 28)}$$

$$\left(\frac{1}{R(\theta, \phi)}\right)dR = \left(\frac{F_t(\theta, \phi)}{F_r\theta, \phi}\right)d\phi \quad \text{(Equation 29)}$$

By the method of separation of variables, $R(\theta, \phi)$ yields $$R_r(\theta, \phi) = \exp\left[\frac{\int F_r(\theta, \phi)}{\int F_v(\theta, \phi)}d\theta + \text{Constant}\right] \quad \text{(Equation 30)}$$

$$R_t(\theta, \phi) = \exp\left[\frac{\int F_t(\theta, \phi)}{\left(\int F_r(\theta, \phi)\right)}d\phi + \text{Constant}\right] \quad \text{(Equation 31)}$$

The integration Constant in each equation is dependent on the initial radius of the kinetic shape and can be solved for by applying the initial radius, $R(\theta_i, \phi_i)$, of the kinetic shape. Once solved, the final three-dimensional kinetic shape equations are:

$$R_r(\theta, \phi) = R_r(\theta_i, \phi_i)\exp\left[\int \frac{F_r(\theta, \phi)}{F_v(\theta, \phi)}d\theta\right] \quad \text{(Equation 32)}$$

$$R_r(\theta, \phi) = R_t(\theta_i, \phi_i)\exp\left[\int \frac{F_t(0, \phi)}{F_r(0, \phi)}d\phi\right] \quad \text{(Equation 33)}$$

Equations (32) and (33) are three-dimensional kinetic shape equations that together describe a three-dimensional kinetic shape that relates an applied weight, RGRF, and TGRF. These equations describe the shape in the radial and tangential direction, respectively. As before, a radial force is produced by the change in radius with elevation angle, while TGRF is produced by a change in azimuth angle.

In the absence of a TGRF, Equation (32) is Equation (11) and, in the absence of a TGRF, forms the same two-dimensional shape. This is made clear when examining Equation (33), whereas the force ratio diminishes, the radius does not change in the tangential direction. Also, as the force ratio increases, the shape increases exponentially in the tangential direction radius.

As an illustration, a kinetic shape can be derived using Equations (32) and (33) that, when loaded with a known weight, will produce a specified RGRF and TGRF. The following force functions define this kinetic shape.

$$F_v(\theta,\phi)=800N \quad \text{(Equation 34)}$$

$$F_r(\theta,\phi)=600N \quad \text{(Equation 35)}$$

$$F_t(\theta,\phi)=100\sin(\phi)+200N \quad \text{(Equation 36)}$$

Figures 11A, 11B:
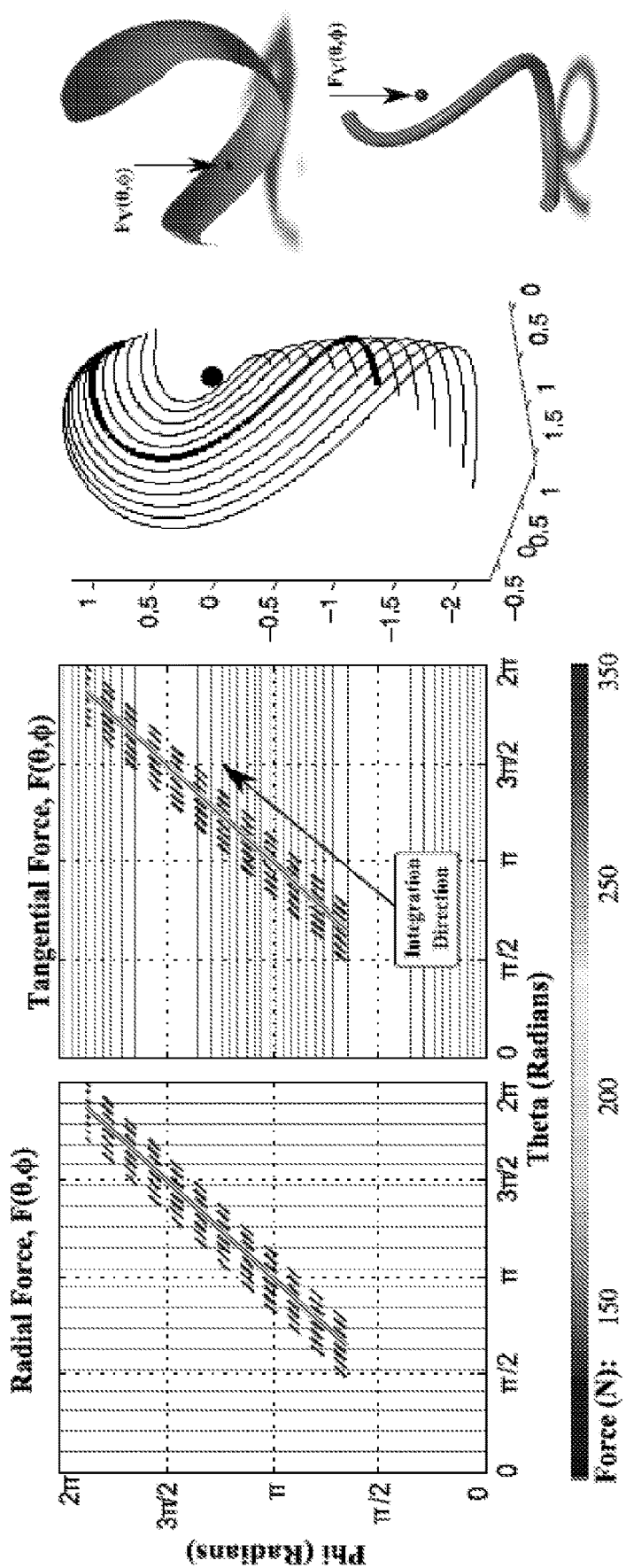
FIG. 11A includes graphs of radial and tangential ground reaction forces that define a three-dimensional kinetic shape.
FIG. 11B includes diagrams that illustrate a derived three-dimensional surface and three-dimensional curved kinetic shape, where the curve is the surface center.

The kinetic shape force function along with the integration path (i.e., shape rotation path) in the radial and tangential direction are shown in FIG. 11A, while the derived shape along with the surface and curve rendering is displayed in FIG. 11B.

Single and subsequent integration paths can form a kinetic shape curve and surface, respectively. However, a kinetic shape surface often cannot statically or dynamically behave as predicted when weight is applied at the axle point due to the interaction between integration paths. Invalid surfaces arise when integration paths that form the surface are not continuously accessible to the ground plane. In many cases, kinetically defined surfaces can be found in which all integration paths are possible, enabling the surface to exert force onto a ground plane.

Once a two-dimensional or three-dimensional static or dynamic kinetic shape has been derived using the methods described above, they can be implemented by constructing an object that incorporates the shape. Numerous such objects can be constructed. Several examples are described below.

Gait Enhancing Mobile Shoes (GEMS)

As described above, gait enhancing mobile shoes (GEMS) have been developed for lower limb rehabilitation (specifically asymmetric gait) that use Archimedean spiral-shaped wheels that can push the wearer's foot backward as he or she steps onto the shoe. The kinetic shape equations described above can be used to create a GEMS having alternative kinetic shapes for the wheels that achieve particular goals, which may be specific to a particular patient.

Figure 12:
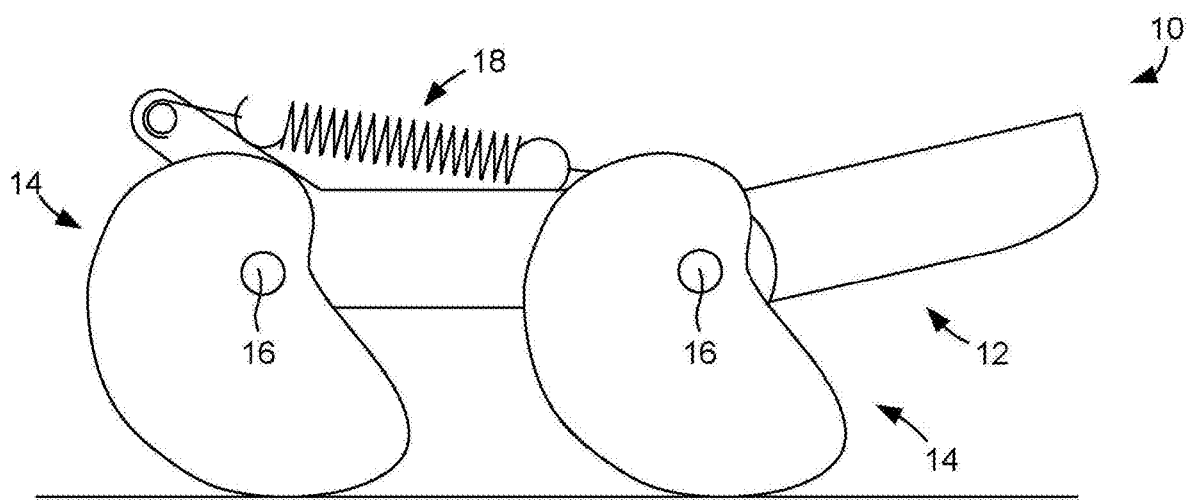
FIG. 12 is a diagram of an embodiment of a gait enhancing mobile shoe (GEMS) having wheels that incorporate a kinetic shape derived using a kinetic shape equation of the present disclosure.

FIG. 12 shows an example of such a GEMS 10. As shown in this figure, the GEMS 10 generally comprises a foot platform 12 that is adapted to receive a foot or shoe, multiple wheels 14 (e.g., four wheels, two on each side) that support the platform about the ground, and axles 16 that rotatably connect the wheels to the platform. As is further shown in FIG. 12, the GEMS 10 can include springs 18 that are used to bias the wheels toward an initial or starting position.

Human gait is divided into two phases: stance and swing. The stance phase consists of initial heel strike, mid-stance, and toe-off. During all three sub-phases, the RGRFs vary from resistive forces at heel strike to assistive forces at toe-off, switching at midstance. Treadmills generate a constant backward velocity and the GEMS was initially designed to create a similar profile. However, the shapes of the GEMS wheels can be designed to optimize the velocity profile to include non-constant velocities and force profiles. In particular, the wheels can be designed using the known applied weight during the stance phase so that the resulting horizontal force is any desired profile.

Figure 13:
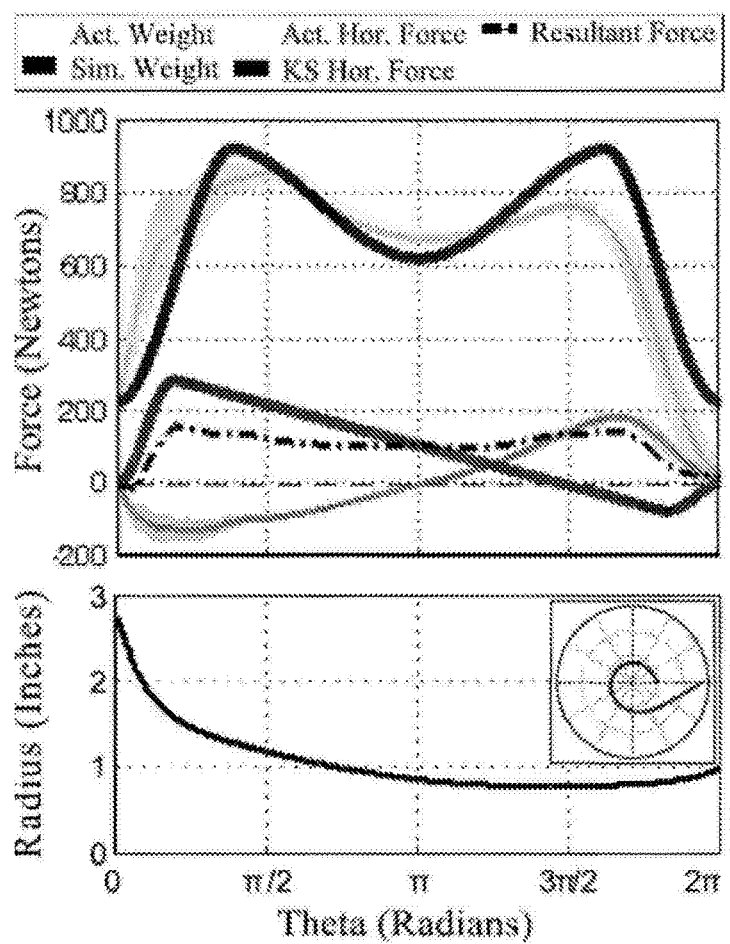
FIG. 13 includes force and radius graphs for a kinetic shape derived to react with a constant 100 N radial force when non-constant walking weight is applied to a GEMS.

During experimentation, actual kinetic gait data was collected from a subject as they walked over a force plate multiple times. This data was then used to design a kinetic shape that produces a constant horizontal (radial) backward force of 100 N. The applied weight and horizontal (radial) reaction force trends were simulated as shown in FIG. 13. The simulated force definition used to derive the kinetic shape was $$F_y(\theta)=120 \sin(1.5\theta)+550 N \quad \text{(Equation 37)}$$

$$F_r(\theta)=(-71\theta+228)+100 N \quad \text{(Equation 38)}$$

To mimic actual data, the applied weight and desired horizontal force functions were windowed with a tapered Tukey window at a taper ratio of 0:4. The derived shape is shown in FIG. 13 with an initial radius of 2:78 in (7:00 cm). The resulting GEMS wheel shape theoretically produces a constant backward force of 100 N. Given the derived wheel shape, the generated radial force is only dependent on the applied weight. Therefore, it is irrelevant how many wheels the GEMS has since the applied weight is distributed through the number of wheels, hence producing a cumulative backwards force of 100 N.

From this example, it can be appreciated that objects can be custom-designed for particular systems or individuals based upon actual data obtained from those systems/individuals.

Prosthetic Shoe Soles

Shoe sole design impacts ground reaction force magnitude and direction during walking. These ground reaction forces can affect lower limb joints and muscles and the spine. A two- or three-dimensional kinetic shape can be derived using the disclosed kinetic shape equations that utilizes gait forces to mechanically filter and redirect these forces in order to change foot pressure distribution or foot orientation to alleviate walking problems.

Foot prosthesis design can greatly benefit from a two-dimensional or three-dimensional kinetic shape derived using the kinetic shape equations in order to predict foot ROS kinetics during walking. Better ROSs can result in more symmetric gait and less frictional forces at the stump.

Walking Crutches

In the past, walking crutches have predominantly been designed using either a point tip or a constant radius tip. However, considering the ground reaction forces during crutch walking, there is no evidence that suggests that either a point tip or a constant radius tip is the most efficient roll over shape to use. To the contrary, there have been numerous studies that suggest that roll over shapes are not a point or constant radius.

A kinetic shape can be derived using the disclosed kinetic shape equations that can be used to as a crutch tip. Such a kinetic shape can be derived with actual ground reaction forces inserted into Equations 14, 26, or 27 to where exerted ground reaction forces assist the crutch user to roll over the crutch tip, making crutch walking more energy efficient and easier.

Figure 14:
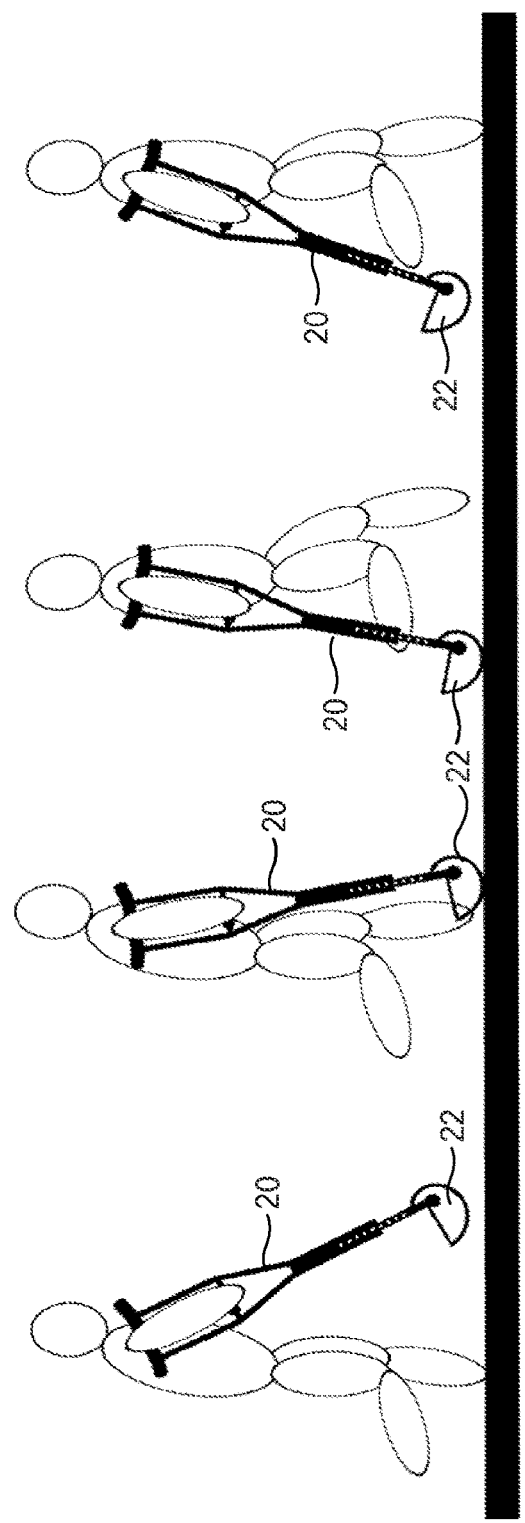
FIG. 14 are sequential views illustrating use of a walking crutch that includes a tip that has a kinetic shape created using a kinetic shape equation of the present disclosure.

FIG. 14 illustrates an example of such a walking crutch 20 being used by a user. As shown in this figure, the crutch 20 includes a crutch tip 22 that is adapted to engage the ground. The tip incorporates a kinetic shape that was derived using a kinetic shape equation.

It is noted that the same principles described above in relation to a crutch tip can be extended to a cane tip.

Kinetic Rocking Boards

Figure 15:
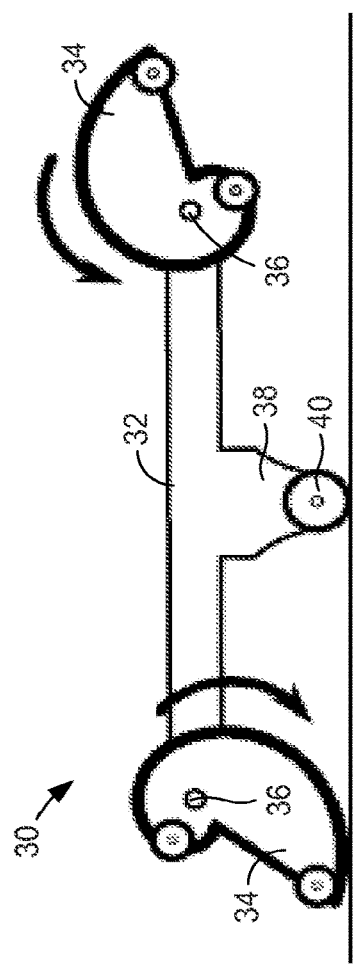
FIG. 15 is diagram of a kinetic rocking board that includes elements that have kinetic shapes derived using a kinetic shape equation of the present disclosure.

If two kinetic shapes are placed on both ends of an elongated platform, and if the platform has a roller in the middle, a rocking board can be created that is able to generate linear motion through a "seesaw" motion. FIG. 15 illustrates an example of such a rocking board 30. As shown in this figure, the board 30 includes an elongated platform 32. Mounted to opposite ends of the platform 32 are kinetic shape elements 34 that can rotate about axles 36. Extending downward from the center of the platform is a pivot arm 38 that includes a roller wheel 40 at its tip.

Figure 16:
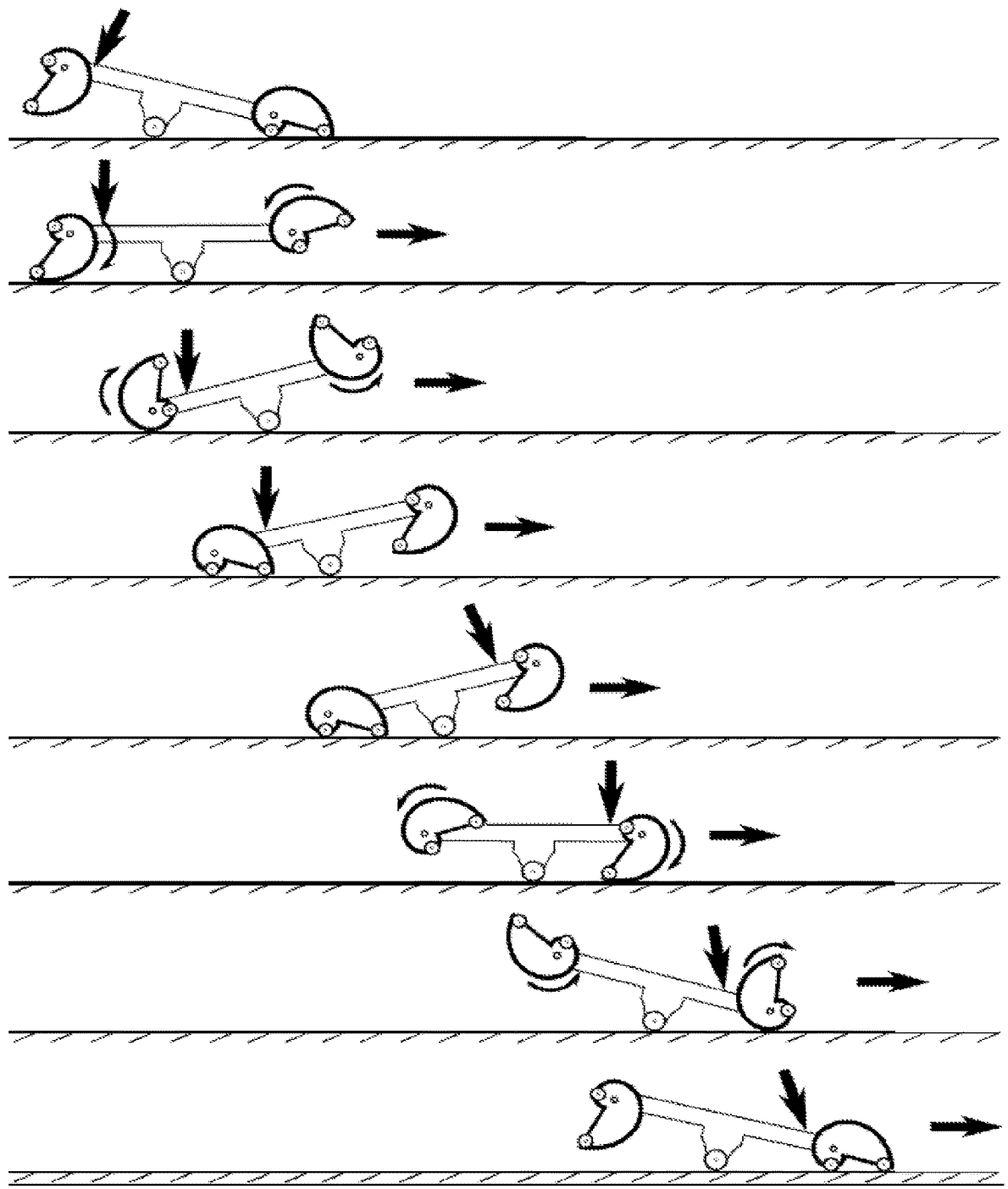
FIG. 16 is a sequence of drawings that illustrate operation of the kinetic rocking board of FIG. 15.

The kinetic shapes of the elements 34 can be derived using the kinetic shape equations such that, when a person stands on the platform 32 and rocks back and forth, the kinetic shapes move the board 10 sideways with a predicted force, as illustrated by the sequential views of FIG. 16.

Kinetic Motion Vehicles

Figure 17:
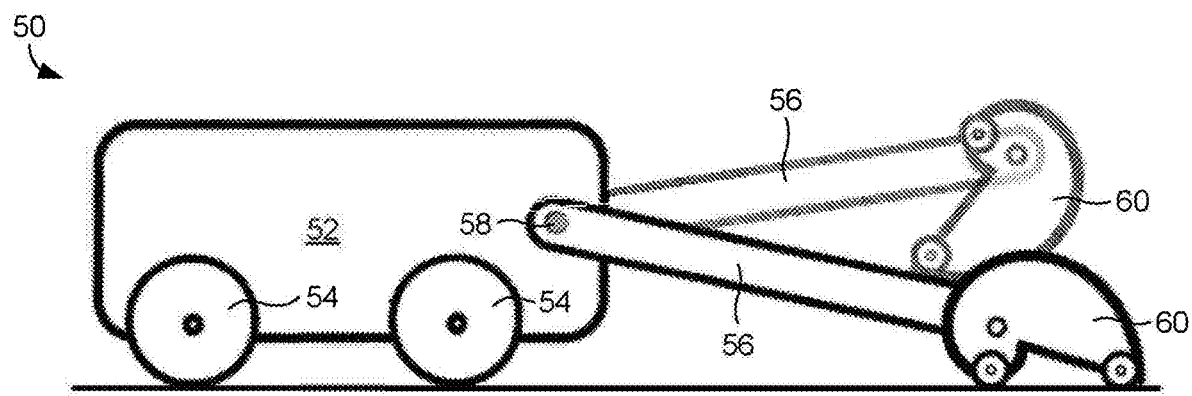
FIG. 17 is a diagram of a kinetic motion vehicle that includes elements that have kinetic shapes derived using a kinetic shape equation of the present disclosure.
Figure 18:
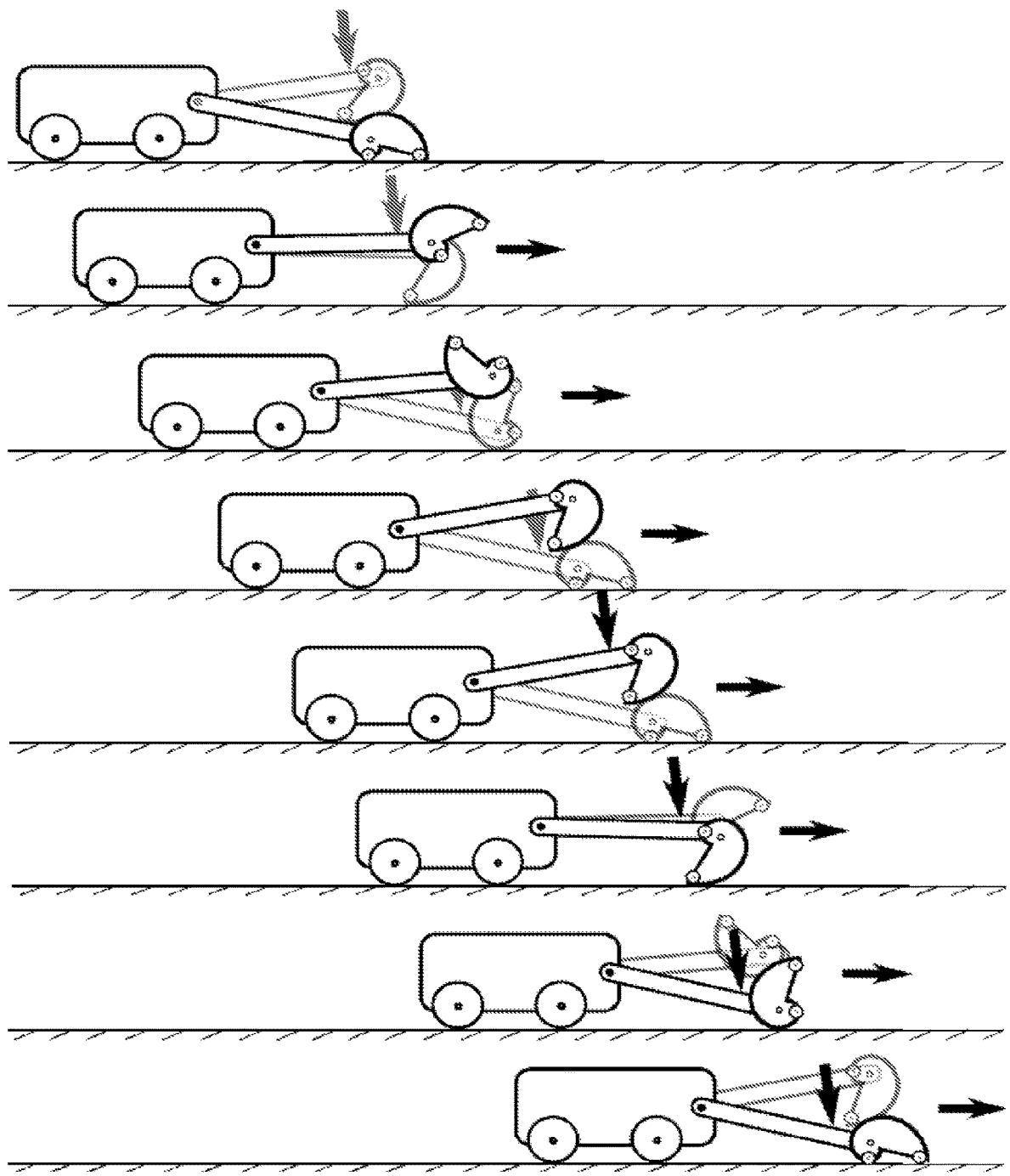
FIG. 18 is a sequence of drawings that illustrate operation of the kinetic motion vehicle of FIG. 17.

Vehicles can be made that operate using principles similar to those described above in relation to FIGS. 15 and 16. FIG. 17 illustrates an example of such a vehicle 50. As shown in this figure, the vehicle 50 generally comprises a body 52 that is able to roll across a flat surface with wheels 54. Extending from one end of the body 52 are arms 56 that can pivot about an axle 58 mounted to the body. Mounted to the distal ends of the arms 56 are kinetic shape elements 60 that can be used to drive the vehicle forward (to the right in FIG. 17) when a user alternately applies weight to the arms. Such motion is illustrated by the sequential views of FIG. 18.

Force Modifiers

It is possible to use kinetic shapes to modify an input force to obtain a desired output force. Due to the nature of kinetic shapes, such a force modifier can be infinitely and exactly adjustable. Such a force modifier could have any number of kinetic shapes included, and thus, can have any number of force modification stages.

Figure 19:
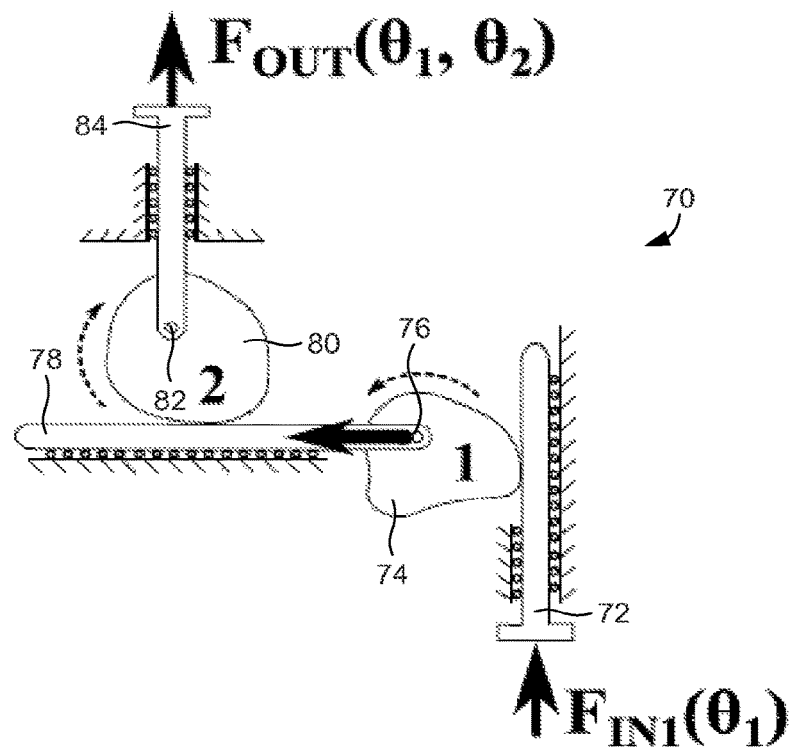
FIG. 19 is a diagram of a force multiplier that includes elements that have kinetic shapes derived using a kinetic shape equation of the present disclosure.

FIG. 19 is an example of a force multiplier 70 in which an input force $F_{IN1}(\theta_1)$ is multiplied by the force multiplier to produce a greater output force $F_{OUT}(\theta_1,\theta_2)$. This force multiplication is achieved by linearly driving a first member 72 with $F_{IN1}(\theta_1)$. This causes a first kinetic shape element 74 in contact with the first member 72 to rotate about an axle 76 mounted to a second member 78. As the first kinetic shape element 74 rotates it causes the second member 78 to be linearly displaced, which causes a second kinetic shape element 80 to rotate. Because the second kinetic shape element 80 is mounted to a third member 84 with an axle 82, as the second kinetic shape element rotates a third member 84 is linearly driven with the output force $F_{OUT}(\theta_1,\theta_2)$ $F_{OUT}(\theta_1,\theta_2)$ is greater than $F_{IN1}(\theta_1)$ because the kinetic shapes of the elements 74 and 80 are different. This provides for a multiplication effect that can be mathematically described as follows:

$$F_{OUT}(\theta_1, \theta_2, \ldots, \theta_n) = \quad \text{(Equation 39)}$$
$$F_{IN1}(\theta_1) \frac{F_{IN1}(\theta_1)}{F_1(\theta_1)} \frac{F_1(\theta_1)}{F_2(\theta_2)} \ldots \frac{F_{n-1}(\theta_{n-1})}{F_n(\theta_n)}$$

Figure 20:
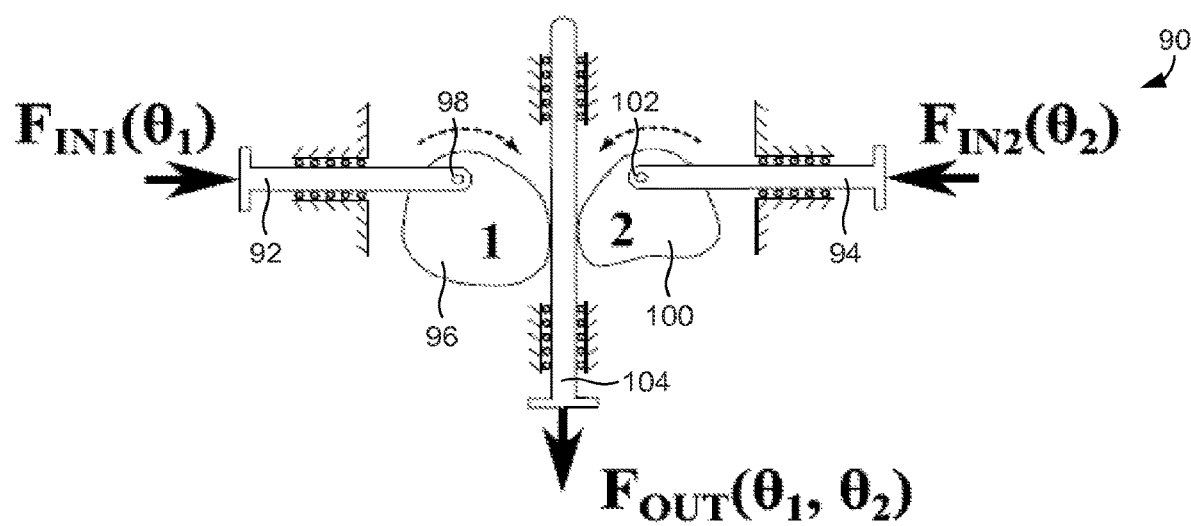
FIG. 20 is a force adder that includes elements that have kinetic shapes derived using a kinetic shape equation of the present disclosure.

Similar force modifiers can be used to provide alternative force modifications. For example, if the force multiplier 70 of FIG. 19 is operated in reverse, i.e., $F_{IN1}(\theta_1)$ is applied to the third member 84 and $F_{OUT}(\theta_1,\theta_2)$ is output by the first member 72, force division can be achieved. Another possible force modification is force addition or subtraction in which multiple input forces (either complementing or opposing each other) are applied to the same member. FIG. 20 illustrates an example of this. More particularly, FIG. 20 shows a force adder 90 that can perform force addition.

As shown in FIG. 20, a first input force $F_{IN1}(\theta_1)$ can be applied to a first member 92 and a second input force $F_{IN2}(\theta_2)$ can be applied to a second member 94. The first input force $F_{IN1}(\theta_1)$ linearly displaces the first member 92 while the second input force $F_{IN2}(\theta_2)$ linearly displaces the second member 94. These displacements cause first and second kinetic shape elements 96 and 100 to rotate about their axles 98 and 102, which are mounted to the first and second members 92, 94, respectively. The rotations of the first and second kinetic shape elements 96, 100 linearly drive a third member 104 with an output force of $F_{OUT}(\theta_1,\theta_2)$. The input forces are additive because both kinetic shape elements 96, 100 rotate in a direction that urges the third member 104 in the same direction. This addition can be mathematically described as $$F_{OUT}(\theta_1, \theta_2, \ldots, \theta_n) = F_{IN1}(\theta_1) \frac{F_1(0_1)}{F_{IN1}(\theta_1)} + \quad \text{(Equation 40)}$$
$$F_{IN2}(\theta_2) \frac{F_2(0_2)}{F_{IN2}(\theta_2)} + \ldots + F_{INn}(\theta_n) \frac{F_n(0_n)}{F_{INn}(\theta_n)}$$

Notably, force subtraction could be achieved by reversing either one of the kinetic shape elements 96, 100 so that they drive the third member 104 in opposite directions.

Figure 21A:
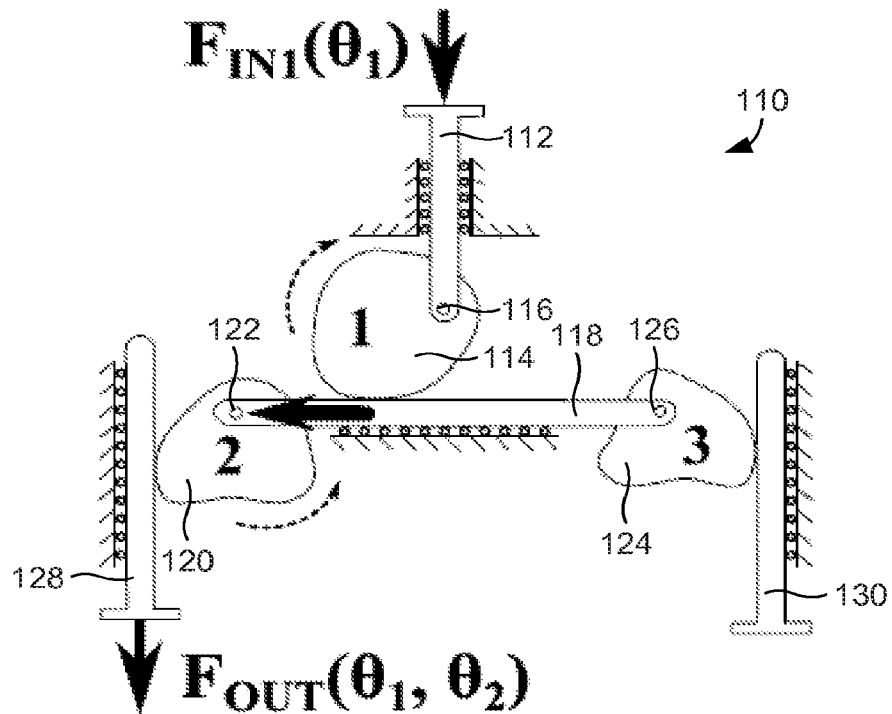
FIGS. 21A and 21B are diagrams of a conditional system that includes elements that have kinetic shapes derived using a kinetic shape equation of the present disclosure.
Figure 21B:
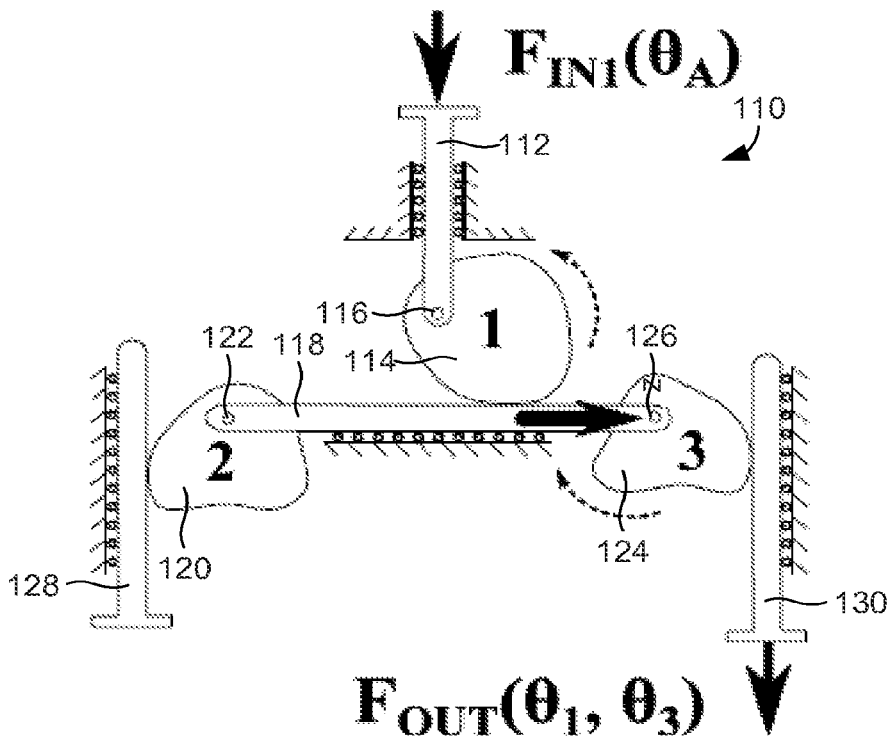

In other embodiments, the output can be conditioned upon the magnitude of the input force. An example of a conditional system 110 is shown in FIGS. 21A and 21B. As shown in these figures, a first member 112 can be driven with an input force $F_{IN1}(\theta_1)$ so as to rotate a first kinetic shape element 114 that is mounted to the first member with an axle 116. Rotation of the first kinetic shape element 114 causes linear displacement of a second member 118, to which second and third kinetic shape elements 120 and 124 are mounted with axles 122 and 126, respectively. If the input force $F_{IN1}(\theta_1)$ is greater than 0, the second member 118 is displaced to the left, the second kinetic shape element 120 is rotated, and a third member 128 is driven with an output force $F_{OUT}(\theta_1,\theta_2)$, as shown in FIG. 21A. If, on the other hand, the input force $F_{IN1}(\theta_1)$ is less than 0, the second member 118 is displaced to the right, the third kinetic shape element 124 is rotated, and a fourth member 130 is driven with an output force $F_{OUT}(\theta_1,\theta_3)$, as shown in FIG. 21B. This functionality can be mathematically described as $$\text{IF } F_1(\theta_1) > 0 \text{ THEN } F_{OUT}(\theta_1, \theta_2) = \quad \text{(Equation 41)}$$
$$F_{IN1}(\theta_1) \frac{F_1(\theta_1)}{F_{IN1}(\theta_1)} \frac{F_2(\theta_2)}{F_1(\theta_1)}$$
$$\text{IF } F_1(\theta_1) < 0 \text{ THEN } F_{OUT}(\theta_1, \theta_3) = F_{IN1}(\theta_1) \frac{F_1(\theta_1)}{F_{IN1}(\theta_1)} \frac{F_3(\theta_3)}{F_1(\theta_1)}$$

Figure 22:
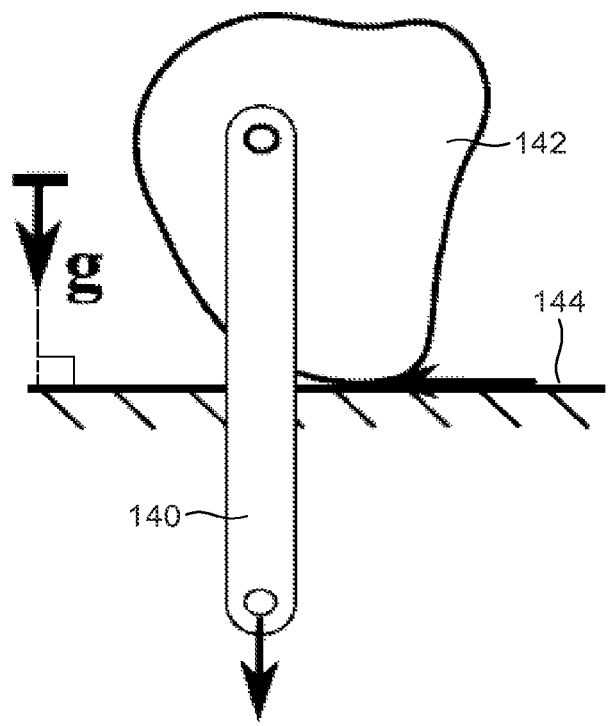
FIG. 22 is a diagram that illustrates application of a pulling force on a kinetic shape element.
Figure 23:
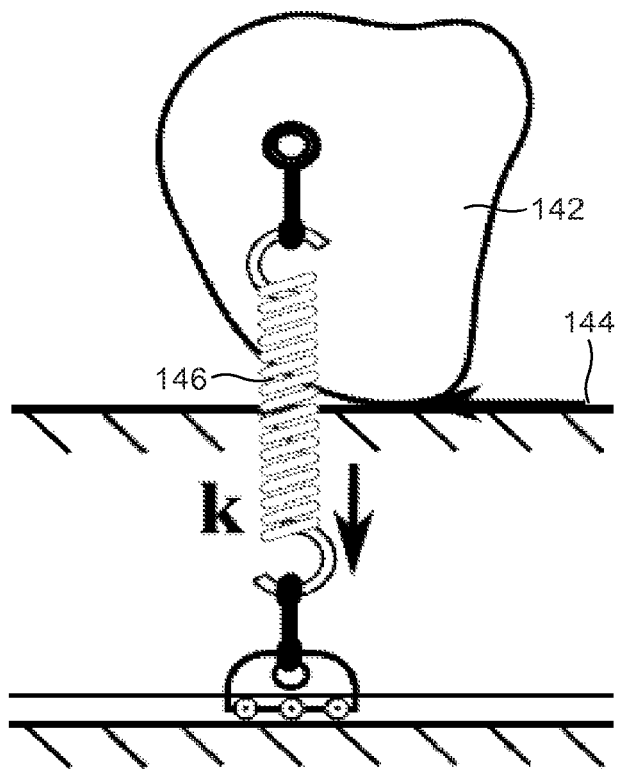
FIG. 23 is a diagram that illustrates applying a pulling force to a kinetic shape element using a spring.

It is noted that, while each of the above force modifiers illustrate applications in which a kinetic shape element is driven (pushed) by a linearly moving member, it is possible for the kinetic shape element to be pulled upon by such a member to achieve a similar effect. This is illustrated in FIG. 22 in which a member 140 applies a pulling force in a downward direction to a kinetic shape element 142 to cause the element to rotate and apply a tangential force to a surface 144. It is further noted that the member that acts (e.g., pushes or pulls) on the kinetic shape element need not be rigid. An example of this is illustrated in FIG. 23 in which the member 140 shown in FIG. 22 is replaced with a spring 146.

It is further noted that, while "rotation" of kinetic shape elements has been described above, the elements may not actually rotate in some cases. For instance, the elements may simply apply a force to another member without rotation.

Kinetic Spine Stretching Devices

Figure 24:
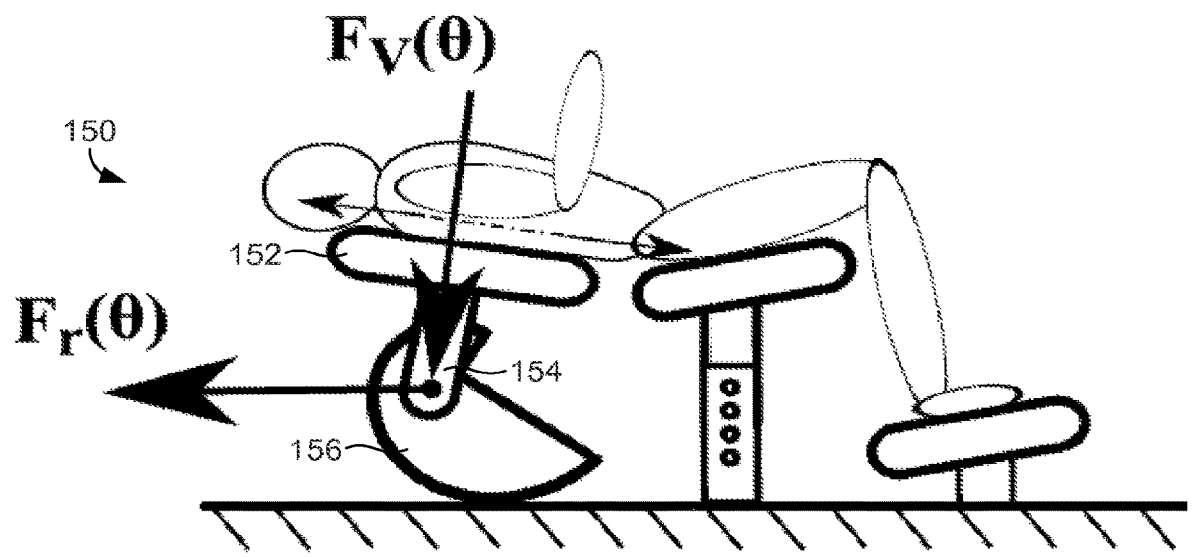
FIG. 24 is a diagram of a kinetic shape spine stretching device that includes an element that has a kinetic shape derived using a kinetic shape equation of the present disclosure.

Currently, inversion is the most common way of providing for spinal decompression. However, a spine stretching device incorporating a kinetic shape derived using a kinetic shape equation can be used to provide spinal decompression in order to alleviate back pain or discomfort. FIG. 24 illustrates an example spine stretching device 150. As shown in this figure, the device 150 includes an upper body support 152 upon which a patient or other user can rest his or her upper body. The upper body support 152 includes a downwardly extending shaft 154 to which is rotatably mounted a kinetic shape element 156 that has a shape derived using a kinetic shape equation. When the user leans back onto the upper body support 152, the kinetic shape element 156 rotates along the ground surface, which applies a horizontal force and decompression in the spine. This horizontal stretching force can be adjusted by changing the kinetic shape and/or repositioning the kinetic shape element 156 to customize the spinal decompression.

Weight-Actuated Lumbar Support Mechanisms

Lumbar support is an important aspect to proper sitting in a chair. There are many products that create static (non-moving) lumbar support. Kinetic shapes can be implemented in a lumbar support mechanism to produce active lumbar support.

Figure 25:
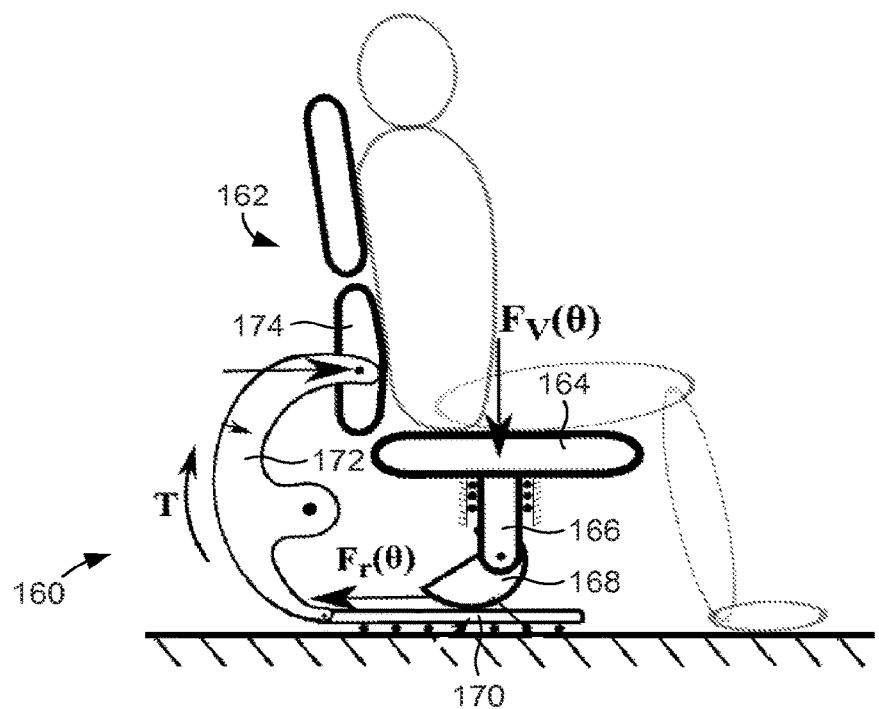
FIG. 25 is a diagram of a lumbar support mechanism that includes an element that has a kinetic shape derived using a kinetic shape equation of the present disclosure.

FIG. 25 illustrates an example weight-actuated lumbar support mechanism 160 applied to a chair 162. Extending downward from a seat 164 of the chair 162 is a shaft 166. Mounted to the distal end of the shaft 166 is a kinetic shape element 168 that is supported on a plate 170 that can be horizontally displaced. Mounted to the plate 170 is a 180 degree bell crank 172 to which a lumbar support 174 of the chair 162 is mounted. As the user sits in the chair 162 and applies a force onto the seat 164 and the kinetic shape element 168, the element displaces the plate 170, which causes the bell crank 172 to pivot and apply a force to the user's lower back. The kinetic shape can be altered or repositioned such that the lumbar support is pushed against the person harder or softer.

Fluid Control Mechanisms

Figure 26:
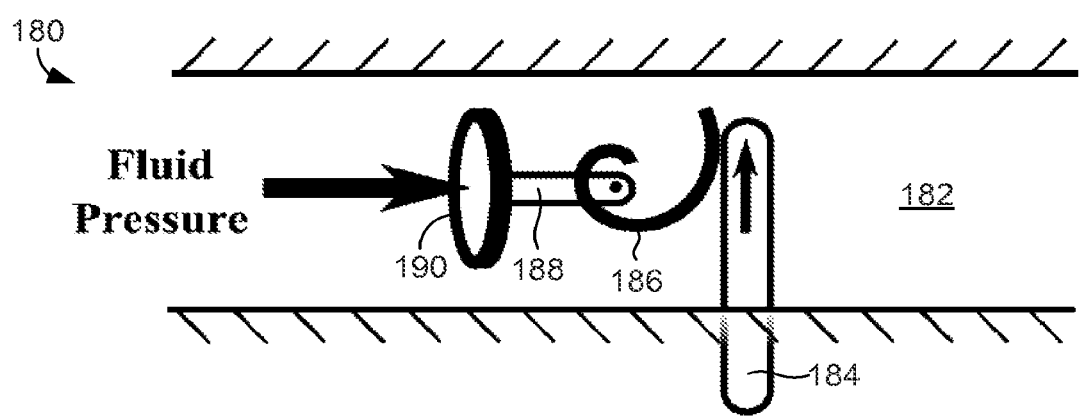
FIG. 26 is a diagram of a fluid control mechanism that includes an element that has a kinetic shape derived using a kinetic shape equation of the present disclosure.

A kinetic shape derived using a kinetic shape formula can be incorporated into fluid control mechanism. FIG. 26 illustrates an example of such a mechanism 180 installed in a pipe 182 through which a fluid flows. The mechanism 180 includes a valve element 184 that can be driven by a kinetic shape element 186 from an open position in which the fluid is free to flow to a closed position in which such fluid flow is halted or otherwise impeded. The kinetic shape element 186 is rotatably mounted to a shaft 188 that extends from a plate 190 that is orientated to as to be generally perpendicular to the flow. As the fluid pressure builds on the plate 190, the plate is pushed backward and causes the kinetic shape element 186 to rotate, which in turn drives the valve element 184. The kinetic shape of the element 184 can be derived using a kinetic shape equation to close the mechanism 180 when a particular fluid pressure (and therefore fluid flow) is reached.

Load Testing Equipment

The static application of a two-dimensional kinetic shape can be desirable in surface hardness/properties testing. Consider a surface microindentation hardness testing device/method such as Rockwell, Brinell, or Vickers hardness test. A two-dimensional kinetic shape can be derived such that the examiner utilizes only one applied weight while only having to rotate the kinetic shape in order to get a variable load applied onto the surface micro indentation device. It is also possible to test the surface shear strength of a surface using a kinetic shape as the kinetic shape creates any customized horizontal surface force as a static weight is applied to the kinetic shape.

Variable Dynamic Output for Mobile Robotics

It was shown above that a two-dimensional kinetic shape can be derived that creates a predictable linear kinematics profile of a pushed plate. This concept can be useful in the realm of mobile robotics in which the velocity profile of robot linkages or any robot movement is crucial. This method offers a mechanical alternative to electronic robot dynamics manipulation, torque input, and trajectory control. While the two-dimensional kinetic shape can produce a predictable kinetic and kinematic linear movement, a three-dimensional kinetic shape can be used to produce expected rotary motion. As the kinetic shape reacts with a predictable force, the robotic joint torque algorithm can rely upon and incorporate the reaction force of the kinetic shape.

Dynamically Changing Kinetic Shape

With the kinetic shape and the kinetic shape formulas one can derive a shape that produces desired ground reaction forces when a known weight is applied to the kinetic shape. These ground reaction forces can act in a static and dynamic fashion depending on the application. A kinetic shape can also actively change its form with time as well, that is R(θ,t). This means an "active" or actuated kinetic shape can change its form with respect to either angular velocity or angular acceleration. This can be useful if a design calls for a controlled motion that takes into consideration the position, velocity, or acceleration of something attached to the kinetic shape.

Material Cutters

A flat, non-homogeneous material cut by a roller cutter must be carefully cut by moving slower at tougher parts of the material and faster on easier to cut material. It is possible to derive a kinetic shape that rolls on a flat non-homogenous material with variable velocity with a known and constant weight applied to it.

Mechanical Robotic Limb Control

Robotic limbs often times are electronically controlled to ramp up/down, slow or speed-up their movements at key locations. No mechanical mechanism exists that can move a robotic limb at variable speeds given a constant force input. A kinetic shape can be derived to press down onto a rack which actuates a pinion that is attached to a robotic limb. Applying a known weight to the kinetic shape produces a desired and variable force and in turn motion.

Plate Dispensers/Movers

A kinetic shape can dispense a plate with a predicted force (and acceleration) either with constant or variable acceleration. By pressing a kinetic shape onto a moving plate, a designer could make the plate move in any way (movement) he or she wishes.

Further Applications

Further applications, as well as possible input forces, output forces, and kinetic shapes, are identified in the table provided in FIGS. 27 and 28.

Computer Implementation

Figure 29:
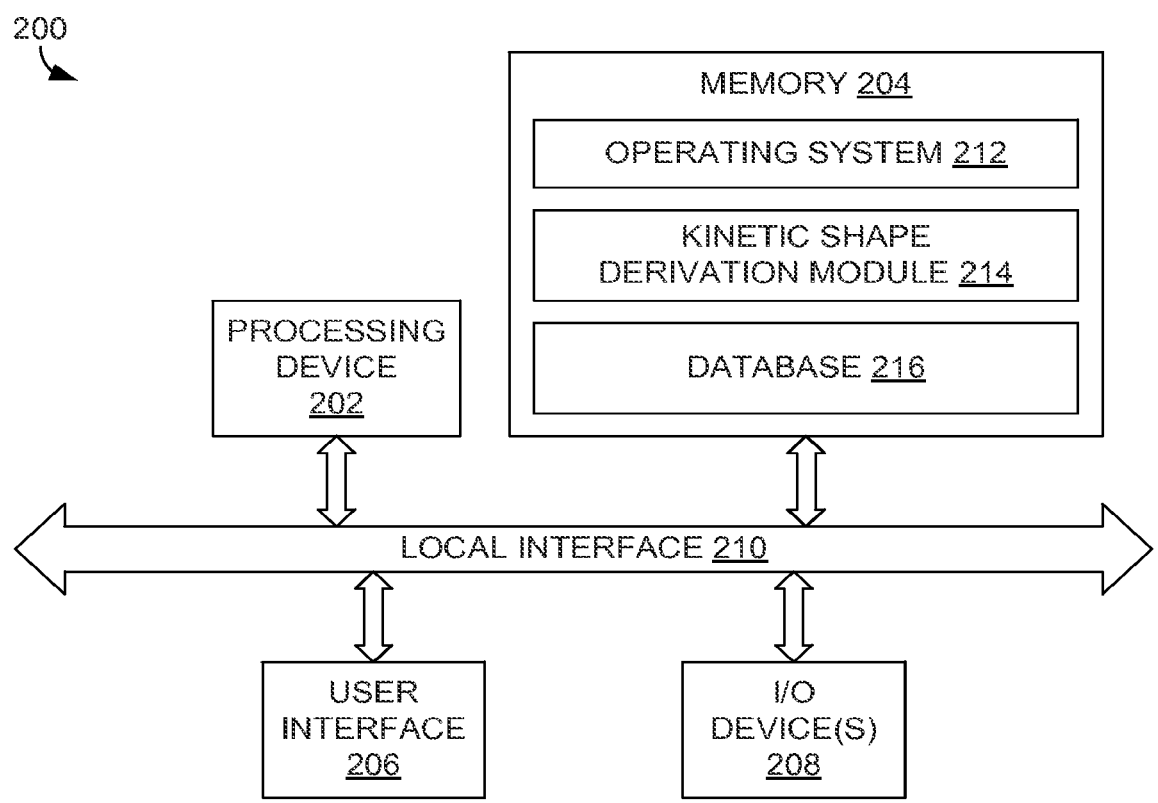
FIG. 29 is a diagram of an embodiment of a computing system configured to derive kinetic shapes.

Kinetic shapes such as those described above can be derived through the use of a suitable computing system. FIG. 29 illustrates an example architecture of such a computing system 200. As shown in this figure, the computing system 200 comprises a processing device 202, memory 204, a user interface 206, and one or more input/output (I/O) devices 208, each of which is connected to a system bus 210. The processing device 202 call, for example, include a central processing unit (CPU) that is capable of executing instructions stored within the memory 204. The memory 204 can include any one of or a combination of volatile memory elements (e.g., RAM) and nonvolatile memory elements (e.g., hard disk, ROM, etc.). The user interface 206 can comprise one or more devices that can enter user inputs into the computing system 200, such as a keyboard and mouse. The I/O devices 208 can comprise components that enable the computing system 200 to communicate with other devices.

The memory 204 (a non-transitory computer-readable medium) stores programs (software) including an operating system 212 and a kinetic shape derivation module 214. The operating system 212 controls the general operation of the computing system 200, while the kinetic shape derivation module 214 comprises one or more algorithms (logic) that can be used to derive a kinetic shape based upon user inputs, such as applied forces and desired reaction forces. The memory can 204 further comprise a database 216, which can be used to store kinetic shapes that have been derived using the module 214. These shapes can be used as inputs for suitable manufacturing equipment used to produce objects that comprise a kinetic shape, such as those described above.

The invention claimed is:

1. A system for manufacturing a mobility aid device having a kinetic shape, the system comprising:
   a user interface, including a user input device;
   a processor;
   a memory communicatively connected to the processor and having a set of software instructions stored thereon which, when executed by the processor, cause the processor to:
   receive information regarding: vertical applied force during a stance phase of a given subject's gait based on the given subject's weight, and a personalized measurement of the given subject's gait, and desired horizontal force to be applied by the mobility aid device during the given subject's stance phase;
   determine a desired reaction force profile based on the personalized measurement, the vertical applied force, and the desired horizontal force, the desired reaction force profile corresponding to desired forces to be applied to the given subject during the given subject's stance phase;

determine a two-dimensional profile for a roll over shape of the mobility aid device based on the information regarding the vertical applied force and the desired reaction force profile to provide the desired reaction force profile upon application of the vertical applied force at an axis of the roll over shape of the mobility aid device of the given subject, according to:

$$R(\theta) = R(\theta_i)\exp\left[\int \frac{F_r(\theta)}{F_v(\theta)} d\theta\right],$$

where θ is an angular position around the two-dimensional profile, R is a radius of the two-dimensional profile, $F_v$ is the vertical applied force, $F_r$ is the desired reaction force profile, and $\theta_i$ is an initial angle of the object; and design the mobility aid device personalized for the given subject, the mobility device comprising the roll over shape based on the two-dimensional profile; and output a file representing the mobility aid device including the roll over shape based on the two-dimensional profile in memory.

2. The system of claim 1, wherein the two-dimensional profile comprises an irregularly curved shape for rotating around the axle, the two-dimensional profile configured to have a peripheral point configured to touch a flat plane, the two-dimensional profile generating the desired reaction force profile parallel to the flat plane in response to a force being applied perpendicular to the flat plane.

3. The system of claim 2, wherein a ground point of the applied force to the flat plane is different from the peripheral point to roll the irregularly curved shape on the flat plane.

4. The system of claim 2, wherein the applied force comprises a constant force.

5. The system of claim 2, wherein the desired reaction force profile comprises a constant force.

6. The system of claim 2, wherein the desired reaction force profile comprises a variable force to determine the two-dimensional profile by determining an angle between the flat plane and a line from the peripheral point to the axle through which the irregularly curved shape rotates.

7. The system of claim 6, wherein the variable force comprises a constant force with a sinusoidal force.

8. The system of claim 6, wherein the variable force comprises a piecewise force function using a plurality of Fourier series terms.

9. The system of claim 1, wherein the file includes an axle point aligned with the axis point and that corresponds to an opening in the mobility aid device for an axle.

10. The system of claim 9, wherein the axle is configured to be attached to a shoe, such that a peripheral point initially contacts a flat plane when a wearer of the shoe takes a step.

11. The system of claim 1, wherein the mobility aid device includes a spring to bias the object toward an initial position of the object at the initial angle.

12. A system for designing a mobility aid device for a user, the system comprising:
a weight bearing member of the mobility aid device, the weight bearing member configured to receive an applied force from a given subject while in motion and to provide the applied force at an axle connected to the weight bearing member;

a non-transitory computer-readable medium storing executable instructions to;
receive information regarding the applied force and desired forces to be applied by the mobility aid device to the given subject,
determine a desired reaction force profile for the mobility aid device to provide a corresponding desired reaction force to the given subject while in motion,
produce a kinetic roll over shape that defines a shape of a wheel for the mobility aid device, the wheel configured to be mounted to the axle, the kinetic shape configured to provide the desired reaction force upon application of the applied force at the axle,
determine an axle point that corresponds to an opening in the wheel for mounting the axle, the kinetic shape based on the applied force and the desired reaction force and having a radius according to:

$$R(\theta) = R(\theta_i)\exp\left[\int \frac{F_r(\theta)}{F_v(\theta)} d\theta\right],$$

where θ is an angular position around the kinetic shape, R is the radius of the kinetic shape, $F_v$ is the applied force, $F_r$ is the desired reaction force, and $\theta_i$ is an initial angle of the wheel; and
a manufacturing equipment that produces the wheel that includes the kinetic roll over shape, the wheel being configured to be connected to the weight bearing member via the axle to form the mobility aid device that is personalized for the given subject.

13. The system of claim 12, wherein the mobility aid device comprise a gait enhancing mobile shoe,
wherein the weight bearing member includes a platform that is configured to receive a foot or a shoe of the user, and
wherein the wheel includes one or more wheels on opposite sides of the platform.

14. The system of claim 13, wherein the applied force is determined during a stance phase of the user.

15. The system of claim 12, wherein the mobility aid device is a walking crutch, and
wherein the wheel is a crutch tip that is configured to engage a ground surface.

16. A non-transitory computer-readable medium comprising instructions to cause a processor to:
obtain kinetic gait data from a subject as the subject walks over a force plate for a plurality of times, the kinetic gait data including an applied weight of the subject to the force plate;
display a prompt to a user via a user interface to input information concerning the kinetic gait data;
based on the input information and the kinetic gait data, determine a desired ground reaction force for a mobility aid device based on a gait symmetry of the subject in response to the applied weight;
calculate a two-dimensional profile for a roll over shape of a ground contacting portion of the mobility aid device, the roll over shape having a radius that varies relative to an axis point of the ground contacting portion, such that the ground contacting portion provides the desired reaction force profile upon application of the applied weight, wherein the radius of the roll over shape is defined according to:

$$R_t(\theta, \phi) = R_t(\theta_i, \phi_i)\exp\left[\frac{F_r(\theta, \phi)}{F_v(\theta, \phi)}d\theta\right],$$

where $\theta$ is an angular position around the kinetic shape, R is the radius of the kinetic shape, $F_v$ is the applied force, $F_r$ is the desired reaction force, and $\theta_i$ is an initial angle of the wheel; and store a design file for the mobility aid device that is custom designed for the subject and includes the two-dimensional profile.

17. The system of claim 16, wherein the desired reaction force is selected to change a foot pressure distribution or foot orientation to improve a gait symmetry of the given subject.

\* \* \* \* \*